United States Patent
Mijares et al.

(10) Patent No.: US 10,354,207 B2
(45) Date of Patent: Jul. 16, 2019

(54) SYSTEMS AND METHODS FOR OPTIMIZATION OF REAL TIME PRODUCTION OPERATIONS

(75) Inventors: Gerardo Mijares, The Woodlands, TX (US); Alejandro Garcia, Rio de Janeiro (BR); Sathish Sankaran, Cypress, TX (US); Jose Rodriguez, Katy, TX (US); Luigi Saputelli, Houston, TX (US); Ankur Awasthi, Houston, TX (US); Michael Nikolaou, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 1425 days.

(21) Appl. No.: 13/461,507

(22) Filed: May 1, 2012

(65) Prior Publication Data
US 2012/0215502 A1 Aug. 23, 2012

Related U.S. Application Data

(62) Division of application No. 12/337,437, filed on Dec. 17, 2008, now Pat. No. 8,396,826.

(51) Int. Cl.
*G06Q 10/04* (2012.01)
*E21B 43/00* (2006.01)
*G06N 20/00* (2019.01)
*G06Q 10/06* (2012.01)

(52) U.S. Cl.
CPC .............. *G06Q 10/04* (2013.01); *E21B 43/00* (2013.01); *G06N 20/00* (2019.01); *G06Q 10/06* (2013.01)

(58) Field of Classification Search
CPC ........ G06Q 10/04; G06Q 10/06; E21B 43/00; G06N 20/00; G06N 5/02; G06N 5/04
See application file for complete search history.

(56) References Cited

U.S. PATENT DOCUMENTS

| | | | |
|---|---|---|---|
| 4,854,164 A * | 8/1989 | Rhoads | 73/152.29 |
| 5,148,365 A | 9/1992 | Dembo | |
| 5,941,305 A * | 8/1999 | Thrasher et al. | 166/53 |
| 6,266,619 B1 | 7/2001 | Thomas et al. | |
| 6,356,844 B2 | 3/2002 | Thomas et al. | |
| 6,853,921 B2 | 2/2005 | Thomas et al. | |
| 7,069,990 B1 * | 7/2006 | Bilak | 166/271 |

(Continued)

FOREIGN PATENT DOCUMENTS

| | | |
|---|---|---|
| WO | 0162603 A2 | 8/2001 |
| WO | 2004100040 A1 | 11/2004 |

OTHER PUBLICATIONS

Saputelli, "Real Time Production Optimization and Reservoir Management", Delft—Stanford Workshop on Closed Loop Reservoir Management, Jun. 28-30, 2004.*

(Continued)

*Primary Examiner* — Eric Nilsson
(74) *Attorney, Agent, or Firm* — Kilpatrick Townsend & Stockton LLP

(57) ABSTRACT

Systems and methods for optimization of real time production operations. In one embodiment, a moving time horizon based parametric model provides fast predictions for production optimization in a short-term framework. In another embodiment, multiple technologies are selected in connection with asset performance workflows that are uniquely implemented in a multi-phase approach.

28 Claims, 14 Drawing Sheets

(56) References Cited

U.S. PATENT DOCUMENTS

| | | | |
|---|---|---|---|
| 7,079,952 | B2 | 7/2006 | Thomas et al. |
| 7,835,893 | B2* | 11/2010 | Cullick et al. .................... 703/6 |
| 2003/0225606 | A1 | 12/2003 | Raghuraman et al. |
| 2004/0153437 | A1* | 8/2004 | Buchan ............................. 707/1 |
| 2004/0254734 | A1 | 12/2004 | Zabalza-Mezghani et al. |
| 2005/0096893 | A1 | 5/2005 | Feraille et al. |
| 2005/0119911 | A1 | 6/2005 | Ayan et al. |
| 2006/0047489 | A1 | 3/2006 | Scheidt et al. |
| 2006/0141637 | A1* | 6/2006 | Hassell, Jr. .......... G01N 1/2035 436/180 |
| 2006/0235573 | A1 | 10/2006 | Guion |
| 2007/0156377 | A1 | 7/2007 | Gurpinar et al. |
| 2007/0179766 | A1 | 8/2007 | Cullick et al. |
| 2007/0179767 | A1 | 8/2007 | Cullick et al. |
| 2007/0179768 | A1 | 8/2007 | Cullick et al. |
| 2007/0192072 | A1 | 8/2007 | Cullick et al. |

OTHER PUBLICATIONS

Saputelli et al, "Real-time reservoir management: A multiscale adaptive optimization and control approach", Computational Geosciences, Mar. 2006, vol. 10, Issue 1, pp. 61-96, Date: Apr. 19, 2006.*

Saputelli et al, "Self-Learning Reservoir Management", Oct. 21 2004; Florianopolis.*

A.G. Tokarev, Notification on results of patentability check, Application No. 2010129434/08, Mar. 4, 2013, 3 pages, Patent Office of the Russian Federation, State Intellectual Property Examiner of the Computer Technique Department, Russia.

Bastien Peelen, Supplementary European Search Report, Serial No. EP08862370.7, dated Sep. 21, 2012, 8 pages, European Patent Office, Netherlands.

Saputelli et al.; "Real-time reservoir management: A multiscale adaptive optimization and control approach"; Chemical Engineering Department, University of Houston, Houston, Texas, USA; Accepted Aug. 8, 2005; Computational Geosciences (2006) vol. 10, No. 1, Mar. 2006; pp. 61-96.

Decady, Albert; International Preliminary Report on Patentability; PCT/US08/87206; Commissioner for Patents, Alexandria, Virginia, USA; dated Oct. 27, 2010; 18 pages.

Nikolaou, M., Cullick, A.S., Saputelli, L., Mijares, G., Sankaran, S. & Reis, L.; "A Consistent Approach Toward Reservoir Simulation at Different Time Scales"; Society of Petroleum Engineers Paper, SPE 99451; 2006; pp. 1-9.

Saputelli, L. & Nikolaou, M.; "Self-Learning Reservoir Management"; Society of Petroleum Engineers Paper, SPE 84064; 2005; pp. 534-547.

Article 34 Amendment and Response; PCTUS08/87206; dated Dec. 22, 2009; 6 pages.

Srinivasan, S. & Caers, J.; "Conditioning Reservoir Models to Dynamic Data—A Forward Modeling Perspective"; SPE 62941; 2000 SPE Annual Technical Conference and Exhibition, Dallas, Texas, USA; Oct. 1-4, 2000; pp. 1-6.

Lechner, J.P. & Zangl, G.; "Treating Uncertainties in Reservoir Performance Prediction with Neural Networks"; SPE 94357; SPE Europec/EAGE Annual Conference, Madrid, Spain; Jun. 13-16, 2005; pp. 1-8.

Zangl, G., Giovannoli, M., & Stundner, M.; "Application of Artificial Intelligence in Gas Storage Management"; SPE 100133; SPE Europec/EAGE Annual Conference and Exhibition, Vienna, Austria; Jun. 12-15, 2006; pp. 1-6.

Artun, E., Ertekin, T., & Watson, R.; "Optimized Design of Cyclic Pressure Pulsing in a Depleted, Naturally Fractured Reservoir"; SPE 117762; SPE Eastern Regional/AAPG Eastern Section Joint Meeting, Pittsburgh, Pennsylvania, USA; Oct. 11-15, 2008; pp. 1-21.

Sampaio, T.P., Filho, V.J.M., & De Sa Neto, A.; "An Application of Feed Forward Neural Network as Nonlinear Proxies for the Use During the History Matching Phase"; SPE 122148; SPE Latin American and Carribbean Petroleum Engineering Conference, Cartagena, Columbia; May 31- Jun. 3, 2009; pp. 1-11.

Zubarev, D.I.; "Pros and Cons of Applying Proxy-Models as a Substitute for Full Reservoir Simulations"; SPE 124815; SPE Annual Technical Conference and Exhibition, New Orleans, Louisiana, USA; Oct. 4-7, 2009; pp. 1-23.

International Search Report and Written Opinion; PCT/US08/87206; dated Aug. 12, 2009; Commissioner for Patents, Alexandria, Virginia, USA; 11 pages.

Office Action; U.S. Appl. No. 12/337,437; dated Jul. 5, 2012; 18 pages.

Lars Koch; Response to Examination Report, dated Nov. 18, 2015, 20 pages; Pizzeys; Australia.

* cited by examiner

SYSTEMS AND METHODS FOR OPTIMIZATION OF REAL TIME PRODUCTION OPERATIONS

CROSS-REFERENCE TO RELATED APPLICATIONS

This application is a divisional of U.S. patent application Ser. No. 12/337,437, filed on Dec. 17, 2008. This application claims priority from U.S. Provisional Patent Application No. 61/014,351, filed on Dec. 17, 2007, which is incorporated herein by reference.

STATEMENT REGARDING FEDERALLY SPONSORED RESEARCH

Not applicable.

FIELD OF THE INVENTION

The present invention generally relates to real-time production optimization ("RTPO"). More particularly, the present invention relates to the selection, integration and implementation of real-time operations ("RTO") technologies including, for example, parametric based models.

BACKGROUND OF THE INVENTION

The oil and gas industry attempts to maximize profitability in a dynamic and uncertain environment while satisfying a variety of constraints. Practitioners have attempted to improve oilfield operations by using better technology and appropriate business processes, among other things. Current practices of production optimization often involve combining mathematical models, field data and experience to make decisions about optimal production scenarios. Often, mid-term decisions are made by performing multiple future production scenario forecasts and selecting the best scenario. However, the selected scenario may not be followed in practice due to various inevitable practical difficulties. As a result, it is required to feedback the deviations from the plan and dynamically reoptimize under the most current production conditions. But updating the numerical reservoir model with new field data through history matching is a laborious task. It is further made difficult by the increasing real time measurements available today that increase the frequency at which field data can be collected. In addition, updating is seriously limited by the discontinuities in the models used by reservoir and production engineers to address the holistic production optimization of the entire field at all time scales. With increasing emphasis on risk analysis that requires several runs of large numerical models, it is imperative to use alternative methods.

Traditional approaches to production optimization workflows often make simplifying assumptions and work within artificial boundaries, to lower the complexity of an all-encompassing optimization problem. While this decomposition creates manageable workflows, it does not adequately support the integration of production optimization at multiple levels.

A number of proxy modeling techniques have been proposed where the output variables (oil recovery factor, multiphase flow rates etc.) are modeled as a function of the input parameters selected through design of experiments (DOE). However, most of these methods focus on data-driven approaches such as response surface techniques based on regression, interpolation, neural network, etc. These methods are relatively easy to setup and capture the nonlinear effects in the training data set. However, reservoir phenomena unseen in the past (e.g., water breakthrough) or operating regimes that lie outside the range of training data set are not adequately predicted by such models. Further, most proxy modeling approaches used in production optimization actually model the reservoir simulator outputs and are seldom validated against real field data. Therefore, there is a need for an integrated model combining the reservoir and production engineering domains.

Additionally, the use of a collaborative environment adds considerable value to the operation of oil and gas assets. The value achieved is maximized when asset personnel can access the right information in an easy, fast and comprehensive manner. In this respect, assets that invest significantly on measurement and automation demand technologies that allow the users to capture, validate and make use of data in business workflows on a real-time basis.

Integrated production operations require coordination of every sector involved to impact the final performance of the asset in the most efficient way. Field personnel often have to perform complex tasks ranging from acquiring field measurements under the best known conditions of the reservoir and plant, analysis and validation of data collected, updating well and field models, and making timely decisions in accordance with asset studies and annual plans.

The implementation of real time operations (RTO) technologies for producing fields enables asset teams to effectively execute workflows related to well production testing, production test validation, production estimation, production losses control, plant efficiency and key performance indicators management. The adopted workflows are enabled through appropriate change management processes in addition to innovative technologies. Reliable and time-effective workflows for production surveillance and testing, continuous performance modeling, and sharing consistent and validated data across multi-disciplinary teams provides better control of operations for the asset management.

Value opportunities exist for these asset operations. Among others, there are at least three clear areas of need which touch across most of the asset performance work processes, including:

Visualization: A coherent strategy to monitor the operations of the asset by providing access to the right data, and standardized rules to convert data into information by involving key people to interpret the information and transform it into knowledge;

Modeling: Make use of Real Time data to continuously optimize operations by validating the models of wells, reservoirs and operations; and Automation: Direct control over the operational variables and platform actuators in an automated and closed loop with the previous two efforts, in order to effectively make decisions that have been already conditioned and validated by the asset managers in different scenarios.

Thus, there is a need for a methodology to select relevant technologies and a phased approach to implement the different workflows.

SUMMARY OF THE INVENTION

The present invention therefore, meets the above needs and overcomes one or more deficiencies in the prior art by providing systems and methods for optimization of real time reservoir production operations and implementing asset performance workflows during real time reservoir operations.

In one embodiment, the present invention includes a computer implemented method for implementing asset performance workflows during real time reservoir operations, which comprises: i) selecting multiple technologies from visualization technology, modeling technology and automation technology using a computer processor, wherein the modeling technology comprises the plant efficiency component, an equipment performance monitoring component, a virtual multi-phase meters component, an enhanced production test component, a production test validation component, a real-time reservoir simulation component and an integrated production optimization component; ii) implementing a first group of the selected technologies in a first asset performance workflow, the first group comprising at least one of the visualization technology and the modeling technology; and iii) implementing a second group of the selected technologies in a second asset performance workflow after implementing the first group of the selected technologies, the second group comprising the automation technology.

In another embodiment, the present invention includes a non-transitory program carrier device tangibly carrying computer executable instructions for implementing asset performance workflows during real time reservoir operations. The instructions are executable to implement: i) selecting multiple technologies from visualization technology, modeling technology and automation technology, wherein the modeling technology comprises the plant efficiency component, an equipment performance monitoring component, a virtual multi-phase meters component, an enhanced production test component, a production test validation component, a real-time reservoir simulation component and an integrated production optimization component; ii) implementing a first group of the selected technologies in a first asset performance workflow, the first group comprising at least one of the visualization technology and the modeling technology; and iii) implementing a second group of the selected technologies in a second asset performance workflow after implementing the first group of the selected technologies, the second group comprising the automation technology.

Additional aspects, advantages and embodiments of the invention will become apparent to those skilled in the art from the following description of the various embodiments and related drawings.

BRIEF DESCRIPTION OF THE DRAWINGS

The present invention is described below with references to the accompanying drawings in which like elements are referenced with like reference numerals, and in which.

DETAILED DESCRIPTION OF THE PREFERRED EMBODIMENTS

Figure 1:
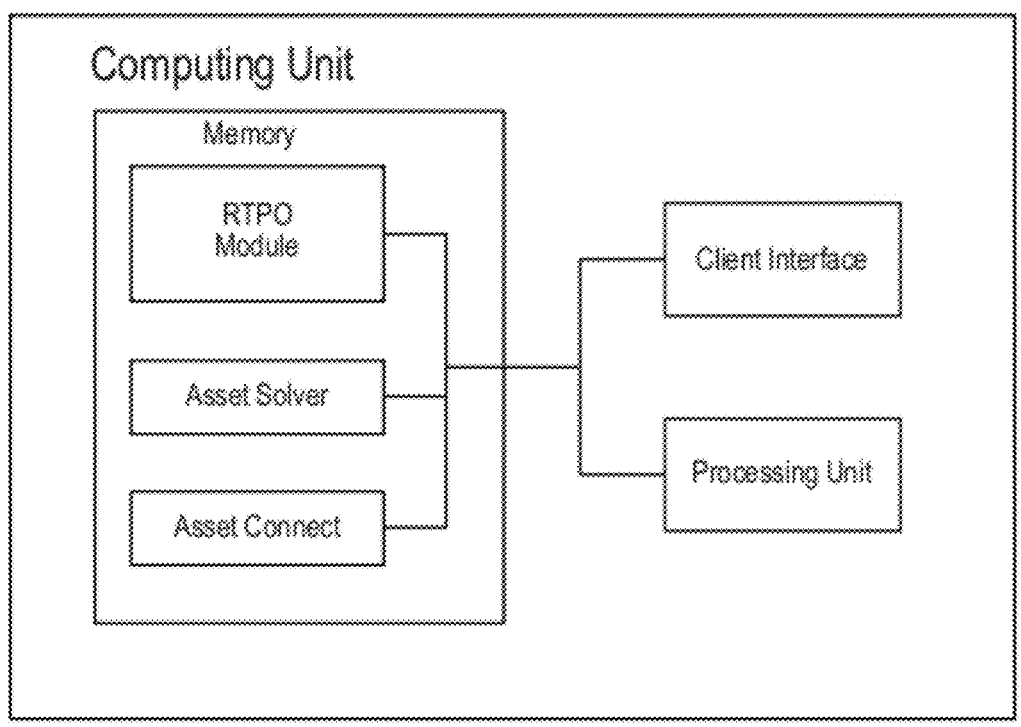
FIG. 1 is a block diagram illustrating one embodiment of a system for implementing the present invention.

The subject matter of the present invention is described with specificity, however, the description itself is not intended to limit the scope of the invention. The subject matter thus, might also be embodied in other ways, to include different steps or combinations of steps similar to the ones described herein, in conjunction with other present or future technologies. Moreover, although the term "step" may be used herein to describe different elements of methods employed, the term should not be interpreted as implying any particular order among or between various steps herein disclosed unless otherwise expressly limited by the description to a particular order.

The methodology used for production optimization is based on a multi-time scale resolution of the problem—namely long term, mid-term and short term optimization. The long term optimization is typically performed over the life of the field considering uncertainties and various field exploitation scenarios. The mid-term optimization focuses on maximizing the profitability following the optimal exploitation plan (in the order of weeks to months); whereas the short term optimization computes the optimal daily production plan subject to constraints and targets passed down from the mid-term optimization results.

Moreover, the methods and systems achieve hierarchical decomposition of the overall production optimization problem at different time scales, where real-time data are consistently used to identify reservoir performance and optimize production. The optimization tasks at each of these levels are organized through automated transactions of targets, constraints, and aggregate measurements. For example, strategic decisions such as long-term (e.g., yearly, monthly) injection targets, production plans etc. calculated using a full-physics reservoir model are resolved into tactical decisions for short-term (e.g., weekly, daily) production planning. The present invention therefore, utilizes a moving horizon based parametric model to provide fast predictions for production optimization in a short-term framework. Since the model structure is based on the decomposition of a full physics reservoir model, it is reasonable to expect that the parametric model will be robust enough to be used for extrapolation outside the range of history data, which is a property needed for optimization purposes. An analysis of the structure of the physics-compliant empirical parametric model, the parametric model's range of applicability, techniques that can be used for parameter identification, and use of the parametric model for short-term production optimization are described herein. In addition, various components of multiple asset performance workflows are revealed in a multi-phase implementation during real time reservoir operations.

System Description

The present invention may be implemented through a computer-executable program of instructions, such as program modules, generally referred to as software applications or application programs executed by a computer. The software may include, for example, routines, programs, objects, components, and data structures that perform particular tasks or implement particular abstract data types. The software forms an interface to allow a computer to react according to a source of input. Asset Solver and Asset Connect™, which are commercial software applications marketed by Landmark Graphics Corporation, may be used as interface applications to implement the present invention. The software may also cooperate with other code segments to initiate a variety of tasks in response to data received in conjunction with the source of the received data. The software may be stored and/or carried on any variety of memory media such as CD-ROM, magnetic disk, bubble memory and semiconductor memory (e.g., various types of RAM or ROM). Furthermore, the software and its results may be transmitted over a variety of carrier media such as optical fiber, metallic wire, free space and/or through any of a variety of networks such as the Internet.

Moreover, those skilled in the art will appreciate that the invention may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present invention. The invention may be practiced in distributed-computing environments where tasks are performed by remote-processing devices that are linked through a communications network. In a distributed-computing environment, program modules may be located in both local and remote computer-storage media including memory storage devices. The present invention may therefore, be implemented in connection with various hardware, software or a combination thereof, in a computer system or other processing system.

Referring now to FIG. 1, a block diagram of a system for implementing the present invention on a computer is illustrated. The system includes a computing unit, sometimes referred to as a computing system, which contains memory, application programs, a client interface, and a processing unit. The computing unit is only one example of a suitable computing environment and is not intended to suggest any limitation as to the scope of use or functionality of the invention.

The memory primarily stores the application programs, which may also be described as program modules containing computer-executable instructions, executed by the computing unit for implementing the methods described herein and illustrated in FIGS. 2-13. The memory therefore, includes an RTPO Module, which enables the methods illustrated and described in reference to FIGS. 2-13, AssetSolver and AssetConnect. AssetSolver may be used as an interface application with the RTPO Module to implement methods for optimization of real time reservoir production operations described herein and illustrated in FIGS. 2-12. AssetConnect may be used as an interface application with the RTPO Module to implement methods for optimization of real time production operations described herein and illustrated in FIGS. 2-12 and to implement methods for implementing asset performance workflows during real time reservoir operations described herein and illustrated in FIG. 13.

Although the computing unit is shown as having a generalized memory, the computing unit typically includes a variety of computer readable media. By way of example, and not limitation, computer readable media may comprise computer storage media and communication media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to, and/or presently being operated on by, the processing unit. By way of example, and not limitation, the computing unit includes an operating system, application programs, other program modules, and program data.

The components shown in the memory may also be included in other removable/nonremovable, volatile/nonvolatile computer storage media. For example only, a hard disk drive may read from or write to nonremovable, nonvolatile magnetic media, a magnetic disk drive may read from or write to a removable, nonvolatile magnetic disk, and an optical disk drive may read from or write to a removable, nonvolatile optical disk such as a CD ROM or other optical media. Other removable/non-removable, volatile/nonvolatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above therefore, store and/or carry computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, or the like.

These and other input devices are often connected to the processing unit through the client interface that is coupled to a system bus, but may be connected by other interface and bus structures, such as a parallel port or a universal serial bus (USB). A monitor or other type of display device may be connected to the system bus via an interface, such as a video interface. In addition to the monitor, computers may also include other peripheral output devices such as speakers and printer, which may be connected through an output peripheral interface.

Although many other internal components of the computing unit are not shown, those of ordinary skill in the art will appreciate that such components and the interconnection are well known.

Method Description

The nomenclature used herein is described in the Society of Petroleum Engineers article "Meeting the Challenges of Real Time Production Optimization—A Parametric Model-Based Approach," by Awasthi, A., S. Sankaran, M. Nikolaou, L. Saputelli, and G. Mijares, ("SPE 111853"), which is incorporated herein by reference and repeated in Table 1 below.

TABLE 1

| Nomenclature | |
|---|---|
| Boldface uppercase | Matrix |
| Boldface lowercase | Vector |
| q | Flow rate |
| S | Saturation |
| β | Terms with formation volume factor |
| N | Prediction horizon, NPV optimization |
| M | Model horizon, MPC |
| P | Prediction horizon, MPC |
| $P_{wf}$ | Bottomhole flowing pressure |
| $P_{tf}$ | Tubinghead pressure |
| $R_o$ | Net selling revenues of oil, US, $/STB |
| $R_g$ | Net selling revenues of gas, US, $/STB |
| $C_w$ | Water operating expense, US, $/STB |
| $C_{w,inj}$ | Water injection expense, US, $/STB |
| d | Discount rate (%) |
| u | Input vector |
| y | Output vector |
| x | State vector |
| $\hat{x}$ | Estimated state |
| $u_{min}$ | Minimum value of input vector ay any given time |
| $u_{max}$ | Maximum value of input vector ay any given time |
| A | Matrix determining system dynamics |
| B | Matrix determining input effects |
| C | Matrix determining system outputs |
| K | Kalman filter |
| $W_y$ | Penalizing the error between the output and the set-point |
| $W_{\Delta u}$ | Penalizing changes in inputs |
| $\hat{T}_m$ | Transmissibility matrix |
| $\hat{T}_h$ | Transmissibility matrix for gravity driven flow |
| $\hat{B}$ | Storage matrix |
| $\hat{A}$ | System matrix |
| Abbreviations | |
| BHP | Bottomhole pressure |
| NPV | Net present value |
| MPC | Model Predictive Control |
| COP | Cumulative oil production |
| CWP | Cumulative water production |
| CWI | Cumulative water injection |
| Subscripts | |
| o | Oil |
| W | Water |
| G | Gas |
| Inj | Injection |
| K | Current time |
| M | Mobility term |
| H | Gravity term |

TABLE 1-continued

| Nomenclature | |
|---|---|
| Boldface uppercase | Matrix |
| Boldface lowercase | Vector |
| Superscript | |
| K | Predicted |
| sp | Set-point (target) |

Multivariable Optimization and Control in the Oil Industry

Figure 2:
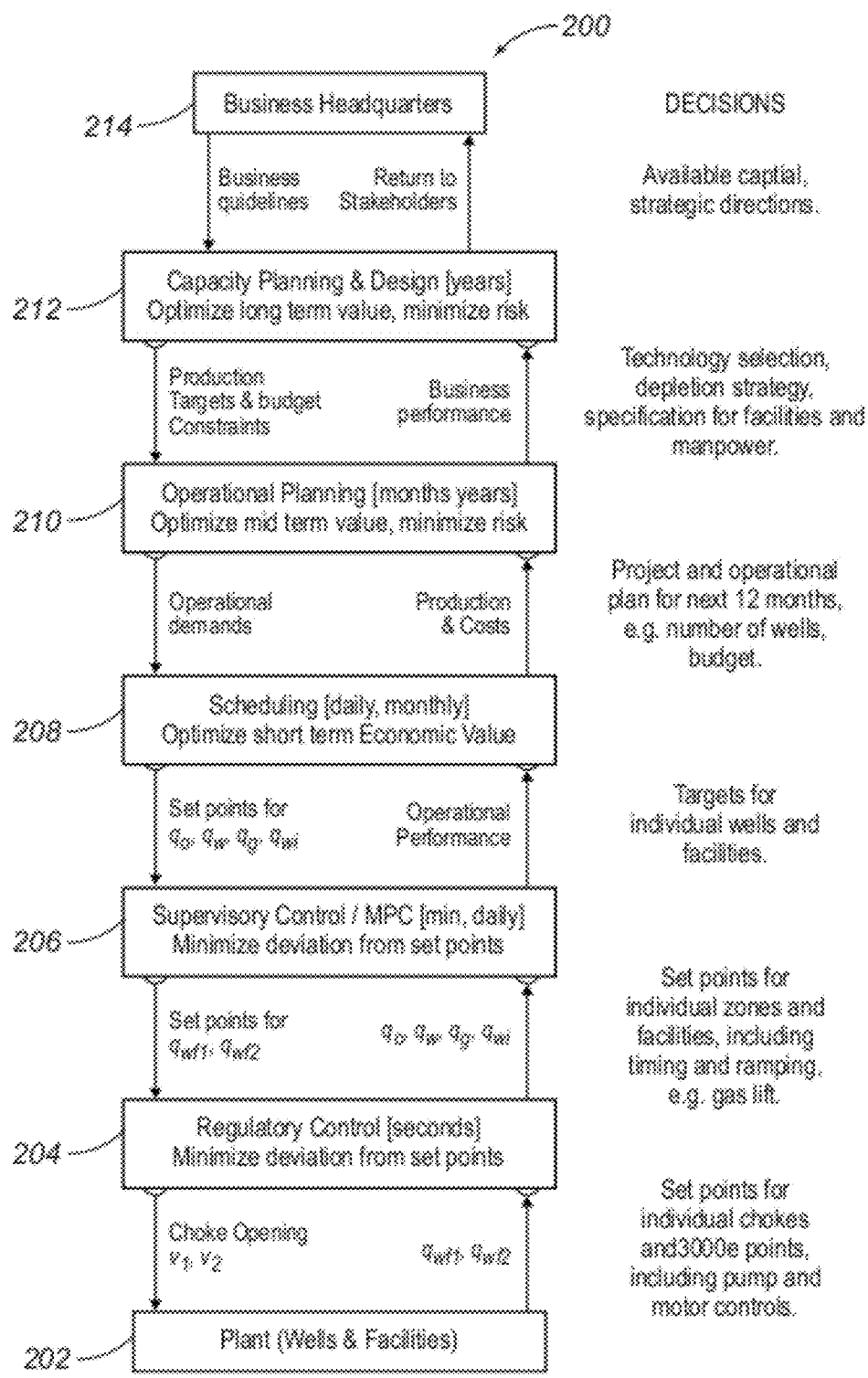
FIG. 2 illustrates a multi-level industrial automation hierarchy of oil-field decision making tasks at different time scales.

Referring now to FIG. 2, different levels of the industrial automation hierarchy, as applied to the oil and gas industry, are illustrated. Specifically, FIG. 2 illustrates a multi-level industrial automation hierarchy 200 of oil-field decision making tasks at different time scales, wherein data movement is bi-directional and is passed from a lower level to an overlying level through the feedback loops while passing the decision as objectives and constraints to underlying levels. Levels 202-208 are lower levels of the hierarchy, which compute the manipulated variables and feedback deviations from targets to the upper levels. Upper levels 210-214 act as corrective set-points to the lower levels, working as a closed-loop system.

In some optimum control theory strategies for enhancing oil recovery in steam, $CO_2$, gas and water injection projects, a control variable is manipulated while an objective function is optimized subject to a number of constraints. The implicit assumption in the above decomposition of the hierarchy into different time scales is that the aggregate of the individual optimum decisions at each level will be close to the overall optimal decision at each point in time. The assumption can be argued based on the fact that decisions made at a certain level pass corresponding targets downward to underlying levels, which, in turn, attain such targets almost instantly with respect to the time-scale of the decision-making level. Even though the multi-level decomposition cannot guarantee a global optimum, it nevertheless makes an otherwise unsolvable problem feasible.

Short-term Parametric Reservoir Model

In practice, reservoir simulation is the de-facto industry standard for reservoir management. However, the increasing industrial attention to RTPO requires tools capable of responding immediately based on real-time field information. The development of advanced reservoir simulation technology leads to large, complex reservoir models. Although larger complex models result in better long-term predictions and overall field management, they often require high computational time. Also, the reservoir model needs to be constantly updated through history matching (adjusting the model parameters to match production history). History matching is often a lengthy task and may sometimes take a year or so to complete. By such time, additional discrepancies arise between the data used to update the model and the actual production. It is for this reason that, often in practice, proxy models are used for short-term decisions that are necessary for optimization of daily production.

Model Formulation

The formulation of the structure of the parametric model begins with first principles—conservation of mass and constitutive equations (Darcy's law, compressibility equations and capillary pressure equations). After discretization with respect to the spatial coordinates, it can be represented in a vector-matrix form as follows:

$$\hat{B}\frac{d\hat{p}}{dt} = \hat{T}_m p(t) - \hat{T}_h h + \hat{q}(t) \quad (1)$$

$$\text{where, } \hat{p}_{i,j,k} = \begin{bmatrix} p_o \\ S_w \\ S_g \end{bmatrix}_{i,j,k} \quad (2)$$

containing values of block oil pressure, water saturation and gas saturation, sufficient to complete the reservoir description at all discretization points (grid blocks) indexed by [i,j,k]. The vector $\hat{q}$ defined as:

$$\hat{q}_{i,j,k} = \begin{bmatrix} q_o \\ q_w \\ q_g \end{bmatrix}_{i,j,k} \quad (3)$$

contains all external fluid flows. The convention is that these external fluid flows are negative at production points, positive at injection points, and zero at all other points. The matrices $\hat{B}$ and $\hat{T}_m$ are associated with formation volume factors and mobilities, while the matrix $\hat{T}_h$ contains terms due to gravity forces and are functions of time.

It is known in the art that, for short-periods of time, the time-dependence of the matrices $\hat{B}$, $\hat{T}_m$ and $\hat{T}_h$ in equation (1) is relatively weak. Therefore, these matrices can be considered to be approximately constant. Using this simplifying assumption, a simplified input-output model of the reservoir described in equation (1) in the standard state-space form may be represented as:

$$\frac{dx}{dt} = Ax(t) + Bu(t) \quad (4)$$
$$y(t) = Cx(t) + Du(t)$$

where the vector x comprises the states of the system, namely the values of $p_o$, $S_w$ and $S_g$ at all discretization points in the reservoir (indexed by [i,j,k] in equations (2)-(3)); the vector y captures the measured outputs (i.e., the production rates of oil, water and gas) in equation (3); the vector u captures the effect of inputs (i.e., bottomhole pressures (BHP's)) and injection flow rates. Matrix A captures the internal dynamics of the reservoir; matrix B shows the effect of inputs on the states; and matrix C generates measurable outputs from system states x. While the streamlining of equation (4) from equation (1) is described in SPE 111853, the following summary outlines the same.

Although equation (1) describes the time evolution of $p_o$, $S_w$ and $S_g$ at all grid blocks inside the reservoir, these values are not always measured (even at grid blocks associated with producers and injectors). But the external flow rates at the injector or producer grid blocks can be either measured using a multi-phase meter or estimated through back allocation. While the output vector y contains values of $\hat{q}$ at grid blocks with injectors and producers, it can be related to the state vector $\hat{p}$ and the input u via equations of the form:

$$\hat{q} = \hat{W}(\hat{p}_{wf} - \hat{p}) + \hat{w}_{pc} \quad (5)$$

where, $\hat{p}_{wf}$ is the well bottomhole pressure (BHP); and $\hat{w}_{pc}$ captures the capillary pressure effects. Substitution of $\hat{q}$ from equation (5) into equation (1) results in a manipulated input u for the entire system which consists of the bottomhole pressures of producers or injectors.

Although the state vector $\hat{p}$ of the system in equation (1) has physical significance, the natural order of the system dynamics is very high corresponding to the number of grid blocks considered in the discretization of the reservoir. However, the input-output model behavior of the system i.e., the effect of bottomhole pressures and injection rates on the production rates at producer grid blocks is expected to be represented by a reduced-order model. Therefore, the state vector x in equation (4) does not need to have physical significance in the same way as $\hat{p}$ but will assist in capturing the input-output behavior of the reservoir.

As aforementioned, the matrices A, B, C, D can be considered approximately constant for short-term predictions i.e., days to weeks. However, they will require an evaluation scheme to maintain the accuracy of the estimated model for short-term prediction purposes as new measurements are available from the field.

The model matrices A, B, C, D are estimated from the available measurements and reported field outputs over a period of time reported in the past using system identification concepts, while continuously updating the model to maintain the accuracy for short-term predictions. Because there are multiple inputs and outputs involved in any reservoir, a subspace identification method that is well known in the art may be used because of its relative simplicity, generality, numerical robustness and particularly suited for multivariable models.

The model parameters of the identified model are updated continuously when the field data is available (e.g., daily) using a moving horizon approach. The updating procedure maintains the accuracy of the model while retaining its inherent structure.

Continuous Model Updating: Moving Horizon Approach

Both in the identification of the parametric model and its application, it is required to reduce the uncertainty of the data used and the effect of decisions on outcomes. For example, if there were complete information about the behavior of the system into the future, one would not need to perform an optimization continuously. However, uncertainty is always present in future predictions, thus making feedback based continual decision making necessary. In addition, what is currently uncertain will be less uncertain in the future as new measurements are made and additional data become available. The effect of uncertainty on the dynamic programming formulation of the optimization problem, which requires evaluating the objective function at distinct values of the state vector $x_i(t+dt)$ with t going to infinity is well known in the art. This creates a huge number of paths to consider for optimization from time t. To avoid this so-called "curse of dimensionality," heuristic alternatives such as the concept of a moving time horizon or receding horizon, which use a moving time window, are particularly useful and well known in the art.

A method to develop such short-term parametric models, refining them using the moving horizon approach and their application to different production operation workflows may be described as data acquisition, data validation and system identification.

Figure 3:
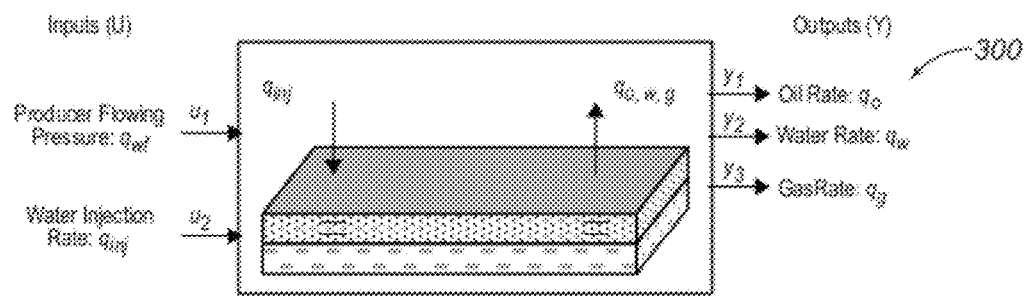
FIG. 3 illustrates an injector/producer example for a single layer reservoir showing all inputs and outputs.

Referring now to FIG. 3, an injector/producer example 300 for a single layer reservoir is illustrated with typical inputs and outputs for a parametric reservoir model. In data acquisition, the model inputs and outputs relevant to the workflow are selected using the available field measurements at the injectors and producers. The bottomhole pressures of the producers, the injection rates as the manipulated inputs u, and the multi-phase rates at the producers as the measured outputs y are appropriate choices for production forecasting and production optimization related workflows.

In data validation, field data for the selected inputs (U) and outputs (Y) are pre-processed by removing outliers, non-zero means and non-stationary trends. An outlier is an observation that lies an abnormal distance from other values in a random sample from a population. Systems that, on an average, have values that are not zero are said to have "non-zero means". And, non-stationary trends include an intrinsically determined monotonic function of time. In the example 300, the inputs U are producer flowing pressure pwf and water injection rate pinj. The outputs Y are oil rate qo, water rate qw, and gas rate qg.

In system identification, the parametric model parameters are selected and the model is identified using the production data and a moving time horizon on a periodic (e.g., daily) basis. Exemplary parameters that may be selected include i) identification horizon and ii) model order.

The parametric modeling methodology discussed above has been applied to the production forecasting workflow. Future predictions may be based on a production and injection plan assuming all inputs were known (even in the future) based on the initial plan. Reasonably accurate short-term (days) and mid-term (weeks) predictions have shown that the reservoir behavior can be captured with the proposed approach. As disclosed hereinafter, such a parametric model can be used within a production optimization framework.

Simultaneous Control and Optimization

Figure 4:
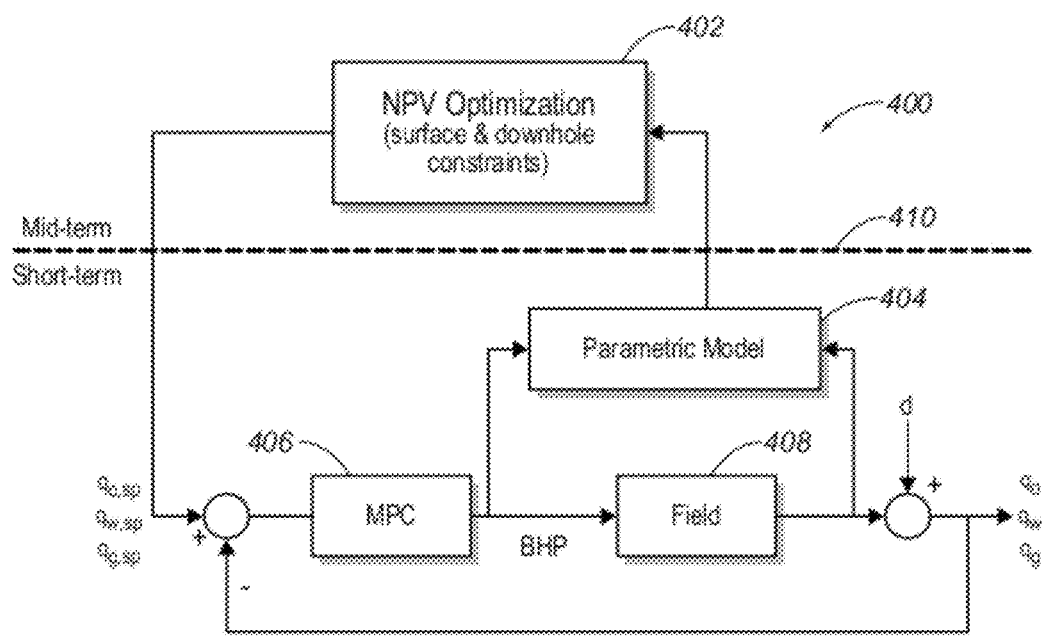
FIG. 4 is a block diagram illustrating a multi-time scale production optimization framework.
Figure 5:
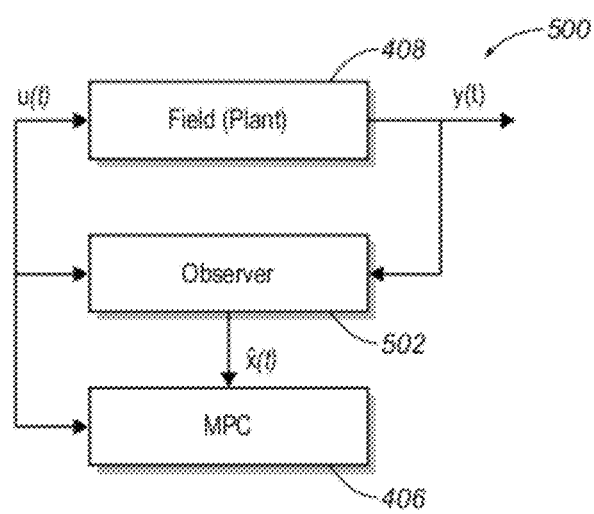
FIG. 5 is a block diagram illustrating a predictive control model.

In the context of the hierarchy illustrated in FIG. 2, the aforementioned parametric model approach may be used in making optimal decisions at different time scales (from days to weeks) corresponding to different levels of the hierarchy. The decisions passed down from the higher levels (e.g., monthly production and injection rate targets calculated on an annual basis) must be consistently resolved into daily targets, knowing the short-term production schedule and field constraints. Current work processes and commercial applications often make simplifying assumptions and do not support such integration of production optimization at multiple time scales. The structure resulting from the interconnection of the various levels is illustrated in FIG. 4, which is a block diagram of a multi-time scale production optimization framework and is similar to the self-learning reservoir management methodology that is well known in the art. The short-term parametric model 404 is used to make production and injection forecasts, which are transmitted to the net present value (NPV) Optimization 402 in the upper mid-term level. The upper mid-term level is separated from the lower short-term level by a dashed line 410. Optimization of the NPV objective function produces multi-phase rates as set-points ($q_{o,sp}$; $q_{w,sp}$; $q_{g,sp}$) that are transmitted to the underlying layer, working in a closed-loop.

Mid-Term Optimization-Maximizing NPV

The upper mid-term level in FIG. 4 optimizes an NPV objective function using the current parametric reservoir model 404, which is subject to bottomhole and surface constraints. Net present value calculations are based on the following economic model:

$$NPV = \max \sum_{k=1}^{N} \frac{[(q_o^k R_o + q_g^k R_g - q_w^k C_w - q_{w,inj}^k C_{w,inj}) \Delta T_k]}{(1+d)^{\frac{k \Delta T_k}{365}}} \quad (6)$$

where, $q_o^k$, $q_w^k$ and $q_g^k$ are the daily production rates of oil (STB/d), water (STB/d) and gas (SCF/d), at time interval k; $q_{w,inj}^k$ is the daily injection rate of water (STB/d); $R_o$ and $R_g$ are the net selling prices of oil ($/STB) and gas ($/SCF); $C_w$ and $C_{w,inj}$ are the cost of treatment of produced and injected water respectively; d is the annual discount factor and N is the number of time intervals or the prediction horizon.

The above equation is subject to the following downhole and surface constraints on the bottomhole pressure ($p_{wf}$) and the tubing head pressure ($p_{tf}$) respectively:

$$p_{wf,min} \leq p_{wf} \leq p_{wf,max} \quad (7)$$

$$p_{tf,min} \leq p_{tf} \leq p_{tf,max} \quad (8)$$

The above optimization exercise is carried on with the information available at each time step assuming the reservoir can be described by the parametric model derived in equation (4). As time progresses the parametric model is updated, and the NPV will be refined continuously. However, due to the linear nature of the parametric state-space model, equation (6) results in a linear objective function and is solved using a linear-optimization routine to find the optimum solution.

Equation (6) can be further simplified in a compact linear form, as provided below in the NPV Objective Function Formulation, as follows:

$$\max_u \{f_1^T u + f_2\} \quad (9)$$
$$A_l u \leq b_l$$

The objective function in equation (6), which is expressed as the finite sum of discounted cash flows during a horizon of N days:

$$NPV = \sum_{k=1}^{N} \frac{[(q_o^k R_o + q_g^k R_g - q_w^k C_w - q_{w,inj}^k C_{w,inj}) \Delta T_k]}{(1+d)^{\frac{k \Delta T_k}{365}}} \quad (10)$$

The objective function is a simple one, with net selling revenues of oil and gas not taking into consideration the associated production costs.

To achieve an optimal solution of equation (10), a time model for $q_o^k$, $q_g^k$, $q_w^k$ and $q_{w,inj}^k$ is assumed that evaluates the cash flow in time for given values of $R_o$, $R_g$, $C_w$, $C_{w,inj}$, d and, finally, finds the maximum value for equation (10) while satisfying the system constraints.

Figures 6A, 6B:
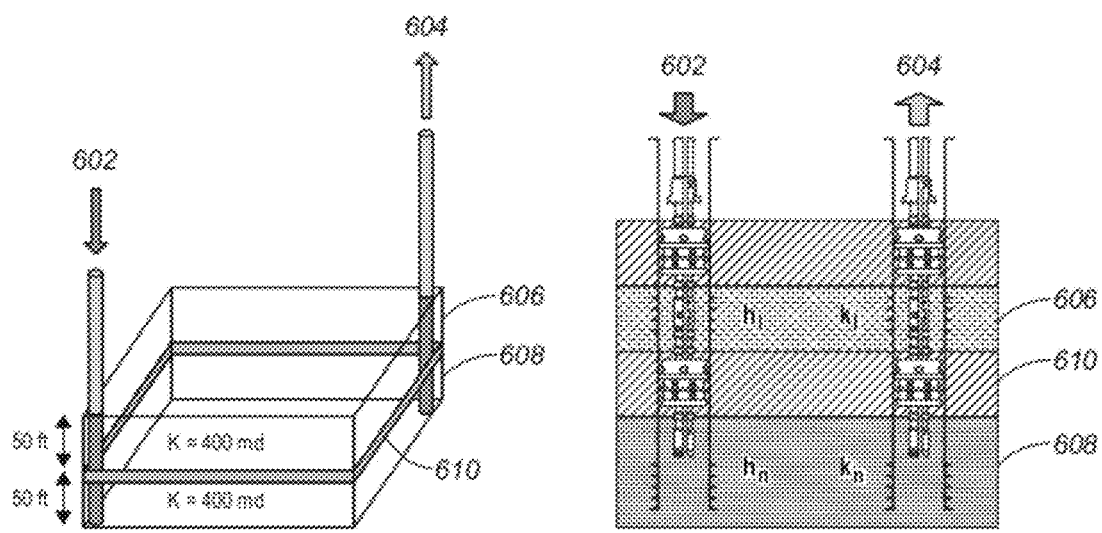
FIG. 6A illustrates a two-layered reservoir with one injector and one producer.
FIG. 6B illustrates a cross-sectional side view of the injector and the producer in FIG. 6A.

Referring now to FIG. 6A, the inputs 602 and outputs 604 for the two layered reservoir system illustrated in FIG. 6A are assumed to be:

$$u = \begin{bmatrix} p_{wf1} \\ p_{wf2} \\ q_{inj1} \\ q_{inj2} \end{bmatrix} \text{ and } y = \begin{bmatrix} q_{o1} \\ q_{o2} \\ q_{w1} \\ q_{w2} \end{bmatrix}, \text{respectively.} \quad (11)$$

Subscripts 1 and 2 refer to variables in the low and high permeability layers, respectively. The parametric model for the inputs (u) and outputs (y) in equation (11) over a horizon can be represented by the standard state-space form as follows:

$$x_{k+j} = Ax_{k+j-1} + Bu_{k+j-1}$$

$$y_{k+j} = Cx_{k+j} + Du_{k+j} \quad (12)$$

By combining the production costs associated with the outputs (y) in a row vector for the $k_{th}$ step in the future:

$$\mathcal{C}_k = \frac{[R_{o1} \; R_{o2} \; -C_{w1} \; -C_{w2}]}{\left(1 + \frac{d}{100}\right)^{\frac{k\Delta T}{365}}} \quad (13)$$

It should be noted that even though the costs are represented differently for each layer, they are nevertheless assumed to be the same. Similarly, representing the injection costs associated with the inputs (u):

$$\mathcal{C}_k^{Inj} = \frac{[0 \; 0 \; -C_{w,inj1} \; -C_{w,inj2}]}{\left(1 + \frac{d}{100}\right)^{\frac{k\Delta T}{365}}} \quad (14)$$

The zero values in equation (14) correspond to the bottomhole pressures of the input which do not appear in the objective function directly. The NPV objective function in equation (10) can be combined with equation (13) and equation (14) and re-written as follows:

$$NPV = [(\mathcal{C}_k y_k + \mathcal{C}_{k+1} y_{k+1} + \ldots + \mathcal{C}_{k+N} y_{k+N}) + (\mathcal{C}_k^{Inj} u_k + \ldots + \mathcal{C}_{k+j}^{Inj} u_{k+N})] \quad (15)$$

Equation (15), when combined with the parametric model predictions, can be represented by the following matrix form:

$$NPV = f_1^T u^N + f_2^T \quad (16)$$

$$\text{where, } u^N = \begin{bmatrix} u_k \\ u_{k+1} \\ \vdots \\ u_{k+N} \end{bmatrix} \quad (17)$$

$$f_1 = \begin{bmatrix} \mathcal{C}_k D + \mathcal{C}_{k+1} CB + \mathcal{C}_{k+2} CAB + \ldots + \mathcal{C}_{k+N} CA^{N-1}B \\ \mathcal{C}_{k+1} D + \mathcal{C}_{k+2} CB + \ldots + \mathcal{C}_{k+N} CA^{N-2}B \\ \vdots \\ \mathcal{C}_{k+N} D \end{bmatrix} + \begin{bmatrix} \mathcal{C}_k^{Inj} \\ \mathcal{C}_{k+1}^{Inj} \\ \vdots \\ \mathcal{C}_{k+N}^{Inj} \end{bmatrix} \quad (18)$$

$$f_2 = \begin{bmatrix} \mathcal{C}_k Cx_k \\ \mathcal{C}_{k+1} CAx_k \\ \vdots \\ \mathcal{C}_{k+N} CA^N x_k \end{bmatrix} \quad (19)$$

The constraints on the inputs (u), over the prediction horizon, can be combined in a similar fashion to give:

$$A_I u^N \le b_I \quad (20)$$

Short-Term Optimization

After the set-points pass from the upper mid-term level in FIG. 4 to the lower short-term level, they are used by the lower short-term level for feedback control. Consistent with the decision making hierarchy described earlier, the parametric model 404 can be used for such short-term optimization or control purposes. Thus, the production optimization problem can be stated as: "Given the operational availability and targets for all wells, calculate the optimum daily production plan or the well flowing pressures (thus, production rates) and injection rates, subject to field constraints."

In FIG. 4, a model-based predictive control (MPC) 406 strategy, which includes a class of well-known control algorithms that explicitly uses a process model for predicting field (plant) behavior and computation of the optimum control action through online optimization of an objective function over a horizon, subject to constraints, may then be used. The development of MPC 406 is based on the block diagram of a predictive control model 500 illustrated in FIG. 5. The main steps measure the field 408 output y(t), estimate the states x̂(t), and deliver a control action to the field 408 input u(t) while trying to track the set-points and rejecting field 408 disturbances. The goal of the Observer 502 is to determine the optimal approximation to the state evolution based on current and past inputs and measurements.

Therefore, FIG. 4 illustrates the interaction of the mid-term and short-term production optimization processes. In short, the mid-term level includes the NPV Optimization 402, which optimizes an NPV objective function using the current Parametric Model 404. The short-term level estimates the Parametric Model 404 based on observed inputs and outputs from the Field 408. The Parametric Model 404 is used in a model-based predictive control algorithm (MPC 406) to optimize the short term Field 408 objectives based on set points (targets) from mid-term optimization.

The optimization problem is set up using the standard MPC formulation with the objective function as follows:

$$\min_{u^M} \left[ \sum_{j=1}^{P} (y_{k+j} - y_{k+j}^{sp})^T W_y (y_{k+j} - y_{k+j}^{sp}) + \sum_{j=0}^{M-1} \Delta u_{k+j}^T W_{\Delta u} \Delta u_{k+j} \right] \quad (21)$$

where P is the prediction horizon, M is the control horizon and $y_{k+j}^{sp}$ is the vector of daily output targets received from the upper economic optimization layer, and $u_{k+j}$ and $y_{k+j}$ are the j-step-ahead vectors of manipulated inputs (e.g., well flowing pressure, injection rates) and measured outputs (e.g., production rates), $W_y$ and $W_{\Delta u}$ are the weighting matrices on output and input deviations, respectively. The field (or the plant) is modeled using the parametric model described in equation (4), shown in discrete time as follows:

$$x_{k+j} = Ax_{k+j-1} + Bu_{k+j-1}$$

$$y_{k+j} = Cx_{k+j} + Du_{k+j} \quad (22)$$

A Kalman filter K used to estimate the model states is given by:

$$\hat{x}(k+1) = A\hat{x}(k) + Bu(k) + K(y(k) - C\hat{x}(k)) \quad (23)$$

where, K is estimated as part of the identification algorithm assuming a Gaussian measurement noise.

The above objective function is subject to the field constraints as follows:

$$u_{min} \leq u_{k+j} \leq u_{max}$$

$$y_{min} \leq y_{k+j} \leq y_{max} \qquad (24)$$

and $$\Delta u_{k+j} = u_{k+j} - u_{k+j-1} \qquad (25)$$

Equations (21)-(25) can be combined to give the following convex optimization problem:

$$\min_{u} \{u^T H u + u^T f\} \qquad (26)$$

$$A_c u \leq b_c \qquad (27)$$

The above optimization problem is a convex objective cost function (with linear constraints). This implies that the desired control action can be obtained at each sample interval via the solution of a corresponding quadratic program, which can be solved efficiently online.

Given the objective function in equation (21), minimizing deviation between the output and the set-point over a prediction horizon of P:

$$J = \left[\sum_{j=1}^{P}(y_{k+j} - y_{k+j}^{sp})^T W_y (y_{k+j} - y_{k+j}^{sp}) + \sum_{j=0}^{M-1} \Delta u_{k+j}^T W_{\Delta u} \Delta u_{k+j}\right] \qquad (28)$$

Considering the first part of the objective function:

$$J_1 = \sum_{j=1}^{P} (y_{k+j} - y_{k+j}^{sp})^T W_y (y_{k+j} - y_{k+j}^{sp}) \qquad (29)$$

$$J_1 = (Y - Y^{sp})^T W_Y (Y - Y^{sp}) \qquad (30)$$

where, (31)

$$Y - Y^{sp} = \begin{bmatrix} (y_k - y_k^{sp}) \\ (y_{k+1} - y_{k+1}^{sp}) \\ \vdots \\ (y_{k+P-1} - y_{k+P-1}^{sp}) \end{bmatrix}$$

and $$W_Y = \begin{bmatrix} W_{y_1} & & & \\ & W_{y_2} & & \\ & & \ddots & \\ & & & W_{y_P} \end{bmatrix}$$

Using the parametric model in equation (4) to predict in the future, it can be shown that $$Y = P_1 x_k + P_2 u^M \qquad (32)$$

-continued $$\text{where, } P_1 = \begin{bmatrix} C \\ CA \\ CA^2 \\ \vdots \\ CA^{P-1} \end{bmatrix}, \qquad (33)$$

$$P_2 = \begin{bmatrix} D & \vdots & \vdots & 0 \\ CB & D & \vdots & 0 \\ CAB & CB & D & 0 \\ \vdots & \vdots & \vdots & \vdots \\ CA^P B & CA^{P-1} B & \vdots & CA^{P-M} B + D \end{bmatrix},$$

$$u^M = \begin{bmatrix} u_k \\ u_{k+1} \\ \vdots \\ u_{k+M-1} \end{bmatrix}$$

Combining equation (30) and equation (32) gives:

$$J_1 = (u^M)^T P_2^T W_Y P_2 (u^M) + 2(u^M)^T P_2^T W_Y (P_1 x_k - Y^{sp}) \qquad (34)$$

Similarly, considering the second part of the objective function:

$$J_2 = \sum_{j=0}^{M-1} \Delta u_{k+j}^T W_{\Delta u} \Delta u_{k+j} \qquad (35)$$

Working on similar lines as before, equation (35) can be re-written as:

$$J_2 = (u^M)^T Q_2^T W_{\Delta u} Q_2 (u^M) + 2(u^M)^T Q_2^T W_{\Delta u} Q_1 u_{k-1} \qquad (36)$$

$$\text{where, } Q_1 = \begin{bmatrix} -1 \\ 0 \\ 0 \\ \vdots \\ 0 \end{bmatrix}_{M \times 1}, Q_2 = \begin{bmatrix} 1 & 0 & \vdots & \vdots & \vdots \\ -1 & 1 & 0 & \vdots & \vdots \\ 0 & -1 & 1 & 0 & \vdots \\ \vdots & \vdots & \vdots & \vdots & \vdots \\ \vdots & \vdots & \vdots & 0 & -1 & 1 \end{bmatrix}, \qquad (37)$$

$$W_{\Delta u} = \begin{bmatrix} W_{\Delta u_1} & & & \\ & W_{\Delta u_2} & & \\ & & \ddots & \\ & & & W_{\Delta u_M} \end{bmatrix}$$

Combining equation (34) and equation (36):

$$J = (u^M)^T \{P_2^T W_Y P_2 + Q_2^T W_{\Delta u} Q_2\}(u^M) + 2(u^M)^T \{P_2^T W_Y (P_1 x_k - Y^{sp}) + Q_2^T W_{\Delta u} Q_1 u_{k-1}\} \qquad (38)$$

Example

The following example illustrates the closed-loop strategy in context to the multi-scale optimization problem described above. The results are compared to conventional practices of no control or reactive control i.e., reactively shut-the zones with high water-cut.

A two-layered reservoir with a line drive injector 602 and producer 604, also referred to as a one-quarter 5-spot configuration, is illustrated in FIG. 6A and FIG. 6B. In FIG. 6B, a cross-sectional side view of the injector 602 and the producer 604 are illustrated. The reservoir has an upper, low-permeability, layer 606 and a lower, high-permeability, layer 608 separated by an impermeable layer 610. A smart well completion is considered where remotely activated valves are available at each permeable layer so that both injection 602 and producer 604 can be remotely adjusted. Both the injector 602 and producer 604 are perforated at each of the two layers 606, 608. The main challenge of this problem is caused by the distinctive permeability values (e.g., ratio 1:10) between the two layers 606, 608.

The following production strategies are compared over a period of eight (8) years, which are summarized in Table 2:

No control: Water is injected at a constant flow rate target in each layer.

Reactive control: Water is injected at a constant flow rate target in each layer as in the no control case, but production from a perforation layer that exceeds a water-cut threshold value is shut-in.

Closed-loop control: The decision variables are the bottomhole pressures of the production layer(s) and the flow rates of the injection layer(s). Thus, for the given reservoir configuration illustrated in FIG. 6A, there are four variables to be manipulated (i.e. $h_1$, $k_1$ and $h_n$, $k_n$). In the upper optimization layer 606, the parametric model is built based on the last 30 days of history to predict the multi-phase rates by maximizing the NPV over a prediction horizon of next 30 days, subject to bottomhole and injection rate constraints for each production and injection layer, respectively. As illustrated in FIG. 4, the optimum multi-phase rates for the next four weeks are then passed on to the lower level where the inputs are manipulated to attain the set-points on a daily basis for the next 30 days according to a moving-time horizon. In the process, the 4×4 multivariable input-output model is updated everyday, to account for any uncertainties.

TABLE 2

| Mode | Production scenario |
| --- | --- |
| No control | Constant injection target of 3000 STB (both layers) |
| Reactive control | Constant injection target of 3000 STB (both layers). Shut in production with WCUT > 0.7 |
| Closed-loop control | $Q_{max}$ < 3000 STB<br>BHP > 9000 psia (both layers) |

Figure 7A:
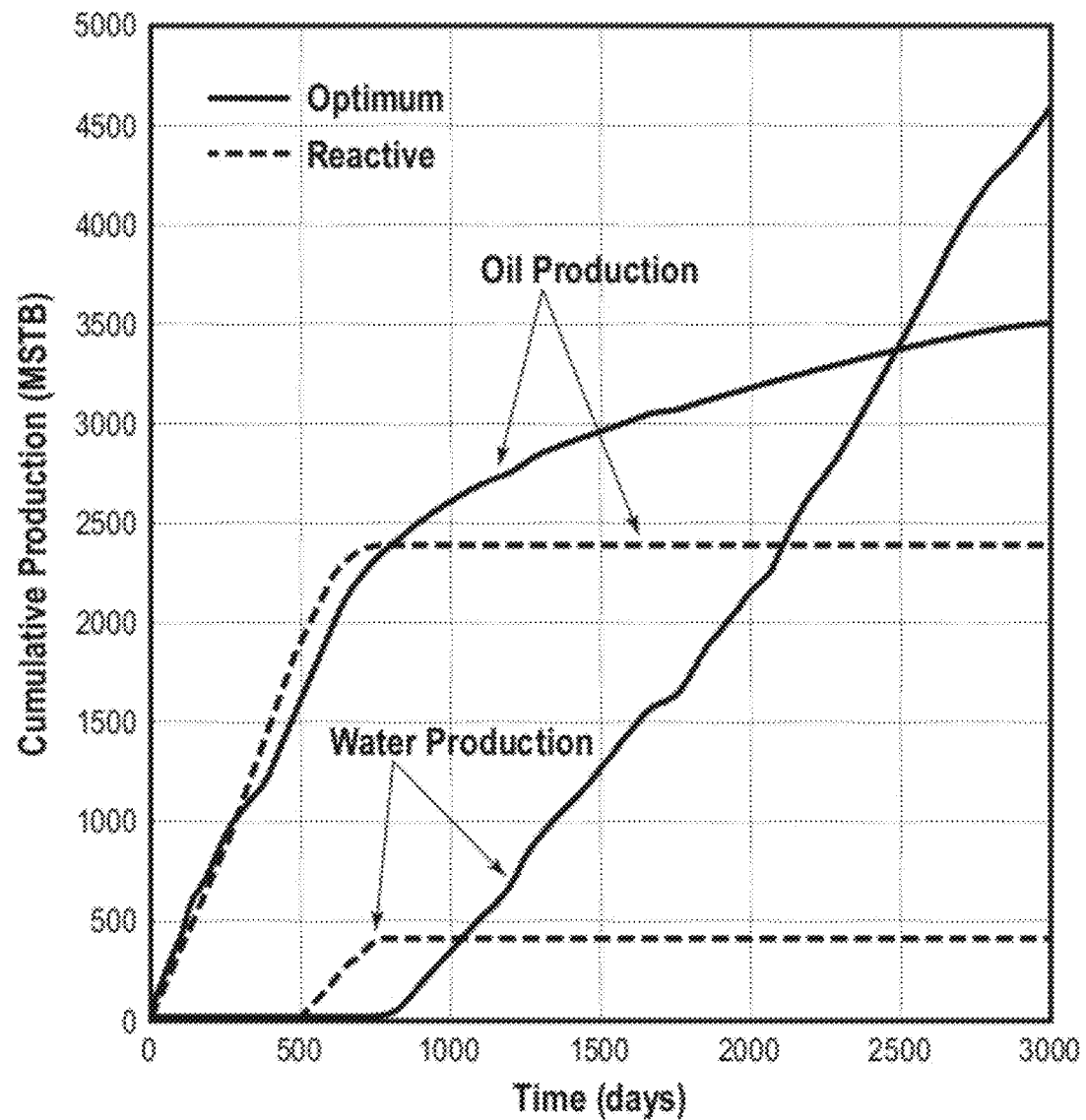
FIG. 7A illustrates the results of cumulative production in thousand stock tank barrels (MSTB) from the field illustrated in FIG. 6A, comparing reactive and closed-loop control (optimum) strategies over time.

Referring now to FIG. 7A, the cumulative oil and water production profiles for the reservoir in FIG. 6A are illustrated. The proposed closed-loop control strategy results in a significant increase in the oil production while the production layer is shut-in for the reactive control as the water-cut increases above 70%. A significant increase in oil production results in a higher NPV over the entire production period; also it is noticeable that water breakthrough is delayed for the closed-loop control case by 210 days (average).

Figure 7B:
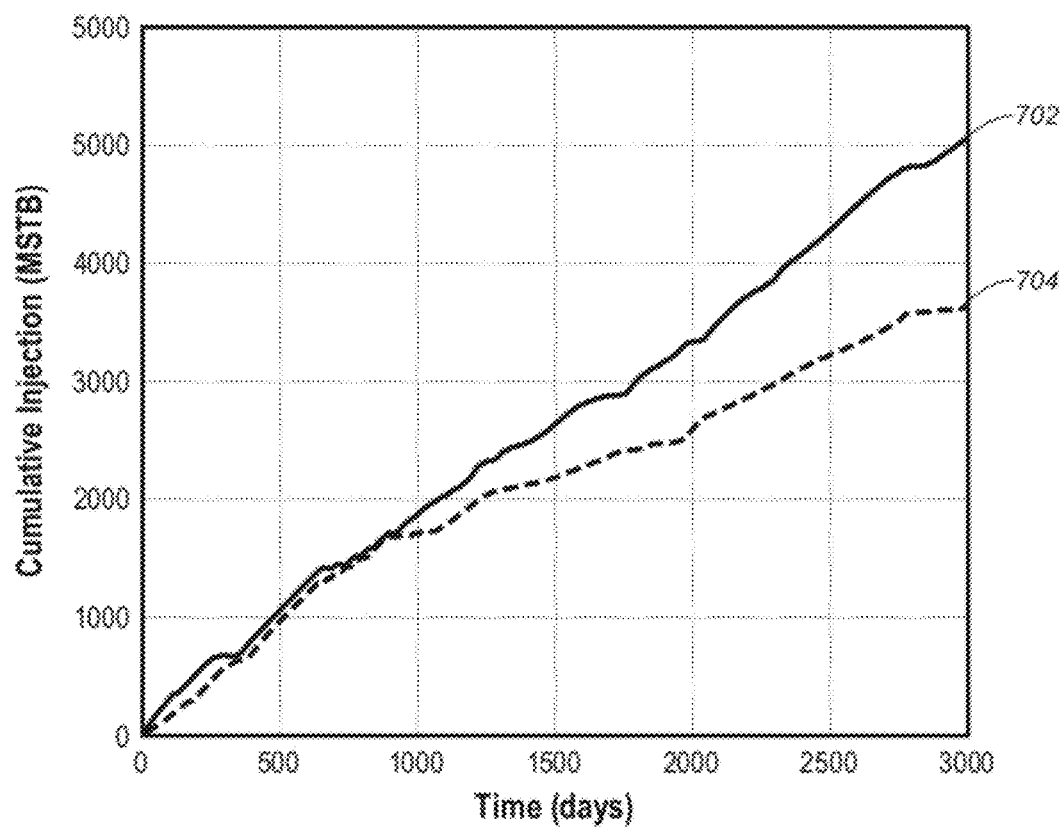
FIG. 7B illustrates a cumulative injection in thousand stock tank barrels (MSTB) from the field illustrated in FIG. 6A for both permeability layers over time.

Referring now to FIG. 7B, the cumulative injection rate (optimum) is compared for both permeability layers. The results from the high permeability layer and the low permeability layer are illustrated as lines 702 and 704, respectively. As water breaks through from the high permeability layer, it is detected and controlled while maximizing the NPV. As more water is produced and water breaks through both layers (720 days), the model expects more oil to be produced from the high permeability layer than the low permeability layer thus injecting water in both layers but in a controlled manner.

The model parameters used for the closed-loop control case for both the upper-level linear optimization and the lower-level quadratic optimization are shown in Table 3. The lower-level, quadratic optimization was performed by predicting a week ahead (P) while manipulating inputs only five days in the future (M). However, implementing only the inputs after the first day and then moving forward in time.

TABLE 3

| Variable | Value |
| --- | --- |
| $R_o$: Oil price ($/STB) | 30 |
| $C_w$, $C_{w,inj}$: Average water-handling cost ($/STB) | 2.5 |
| d: Discount rate (%) | 10 |
| N: Prediction horizon (days) - NPV | 30 |
| M: Control horizon (days) - MPC | 5 |
| P: Prediction horizon (days) - MPC | 7 |

Figure 8A:
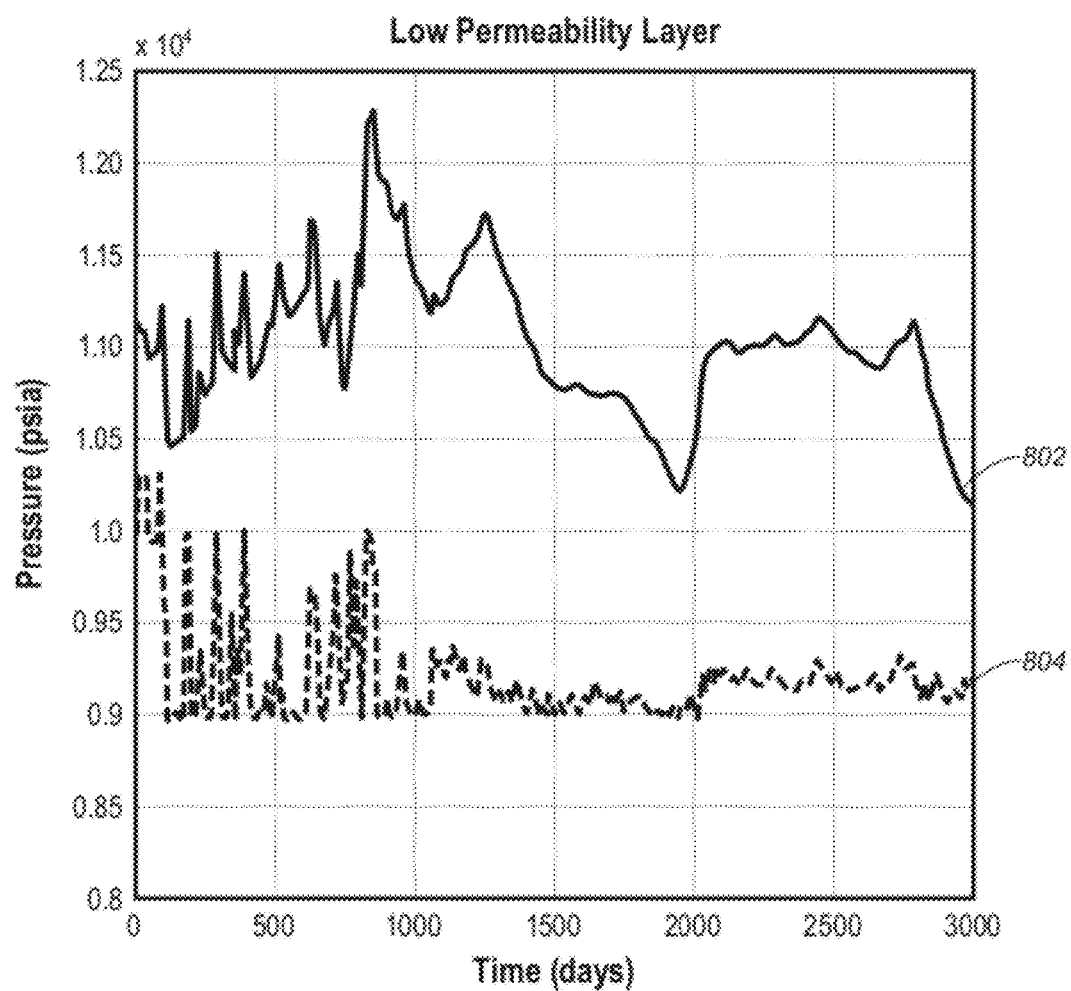
FIG. 8A illustrates a daily manipulated bottomhole pressure for a low permeability layer compared to the average block pressure over time.
Figure 8B:
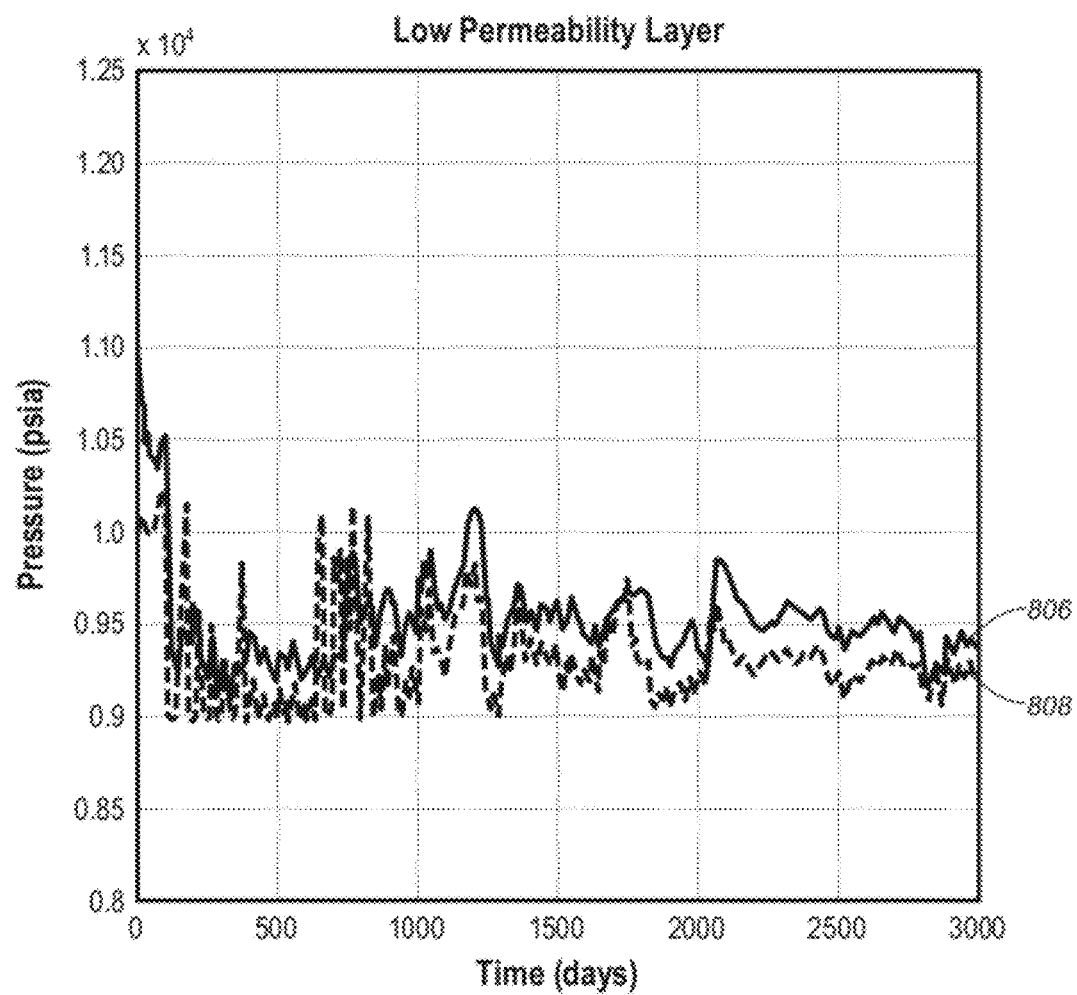
FIG. 8B illustrates a daily manipulated bottomhole pressure for a high permeability layer compared to the average block pressure over time.

The optimum bottomhole pressure (input) profile 804 and 808 for both permeability layers compared to their respective average grid block pressure 802 and 806 are illustrated in FIGS. 8A-8B. It should also be noted that the bottomhole pressures 804 and 808 are constantly adjusted (daily), without any prior knowledge of the reservoir characteristics or the average reservoir pressure. As expected, the drawdown (differential pressure driving fluids from the reservoir to the wellbore) in the low permeability layer is higher compared to that for the high permeability layer to produce the same target oil rate.

Figure 9A:
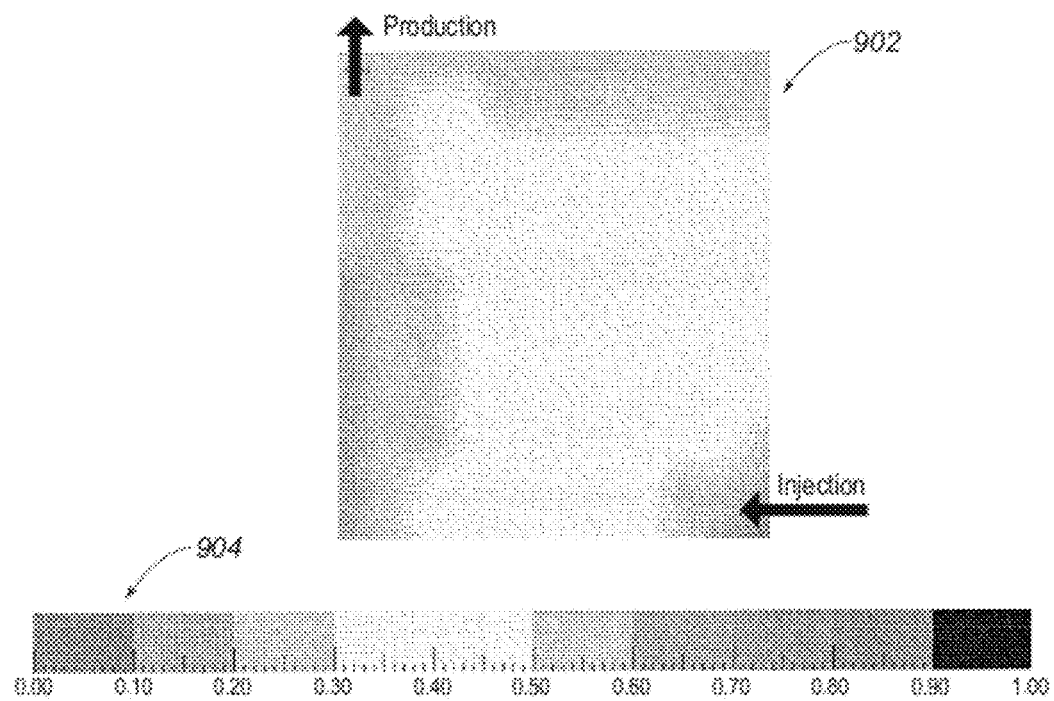
FIG. 9A illustrates oil saturation distribution (aerial view) of the low permeability layer for the reactive control production scenario after 3000 days.
Figure 9B:
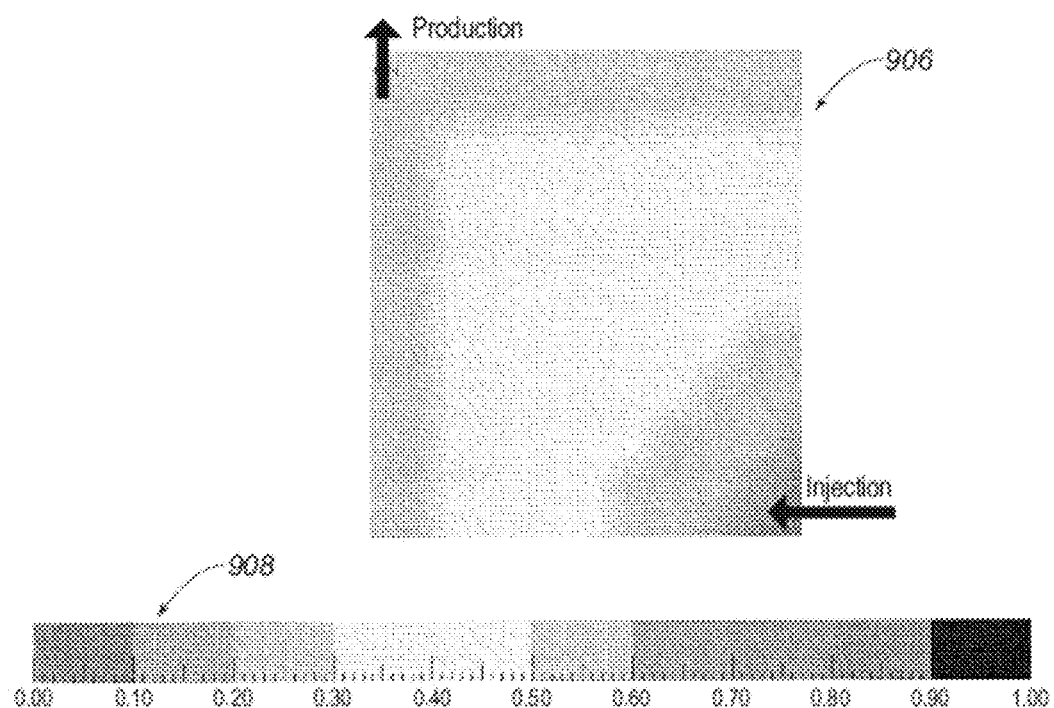
FIG. 9B illustrates oil saturation distribution (aerial view) of the low permeability layer for the closed loop control production scenario after 3000 days.
Figure 10A:
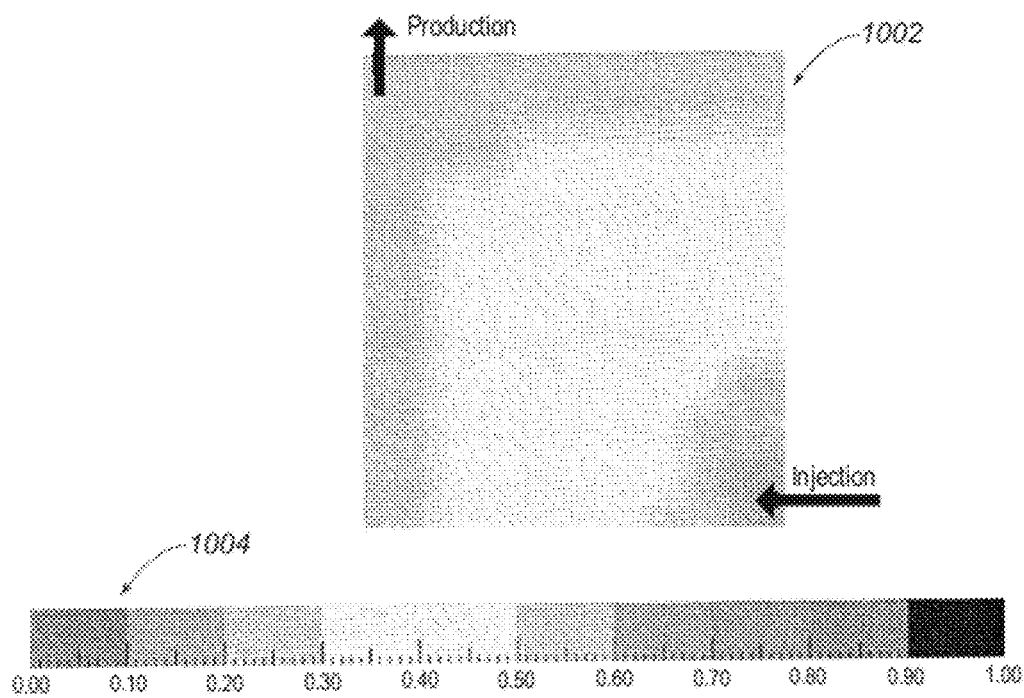
FIG. 10A illustrates oil saturation distribution (aerial view) of the high permeability layer for the reactive control production scenario after 3000 days.
Figure 10B:
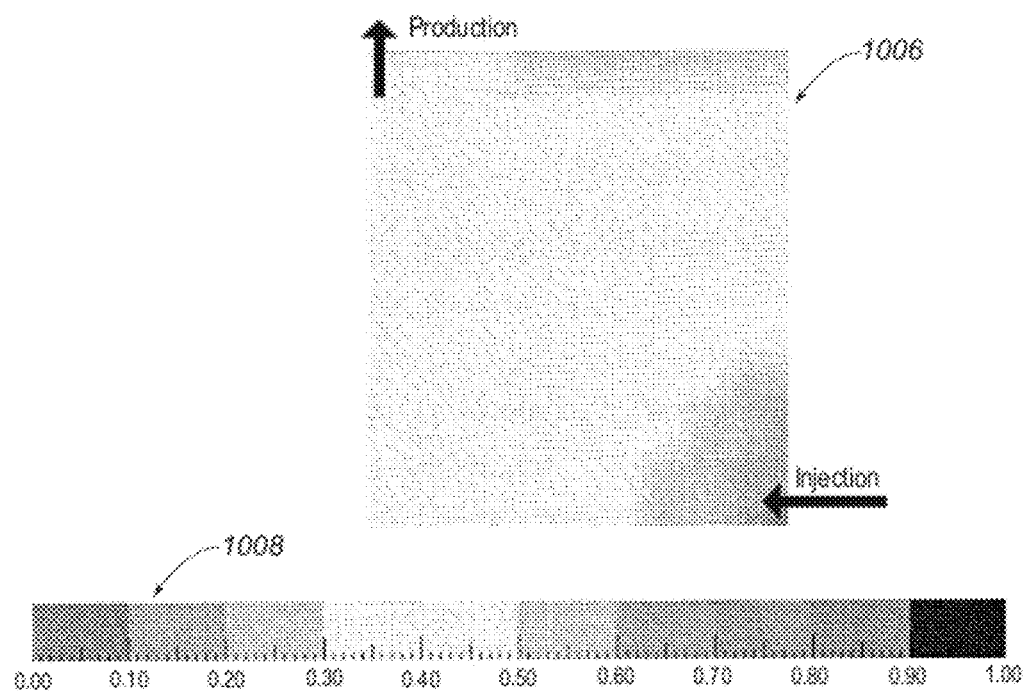
FIG. 10B illustrates oil saturation distribution (aerial view) of the high permeability layer for the closed loop control production scenario after 3000 days.

An aerial view of the oil saturation distribution for the low permeability layer after 3000 days (end of simulation) is illustrated in FIGS. 9A and 9B. The reactive control case is illustrated in FIG. 9A, while the closed-loop control case is illustrated in FIG. 9B. Vertical sweep efficiency for each case 902, 906 is illustrated in FIGS. 9A and 9B, respectively. Grid block oil saturation is measured by the shaded graph 904, 908 in FIGS. 9A and 9B, respectively. For both the reactive control case and the closed-loop control case, the fluid distributions are fairly similar except that the closed-loop control case shows better vertical sweep efficiency. However, better efficiency is not the case for the high permeability layer—as illustrated in FIGS. 10A and 10B. The reactive control case after 3000 days is illustrated in FIG. 10A, while the closed-loop control case after 3000 days is illustrated in FIG. 10B. Vertical sweep efficiency for each case 1002, 1006 is illustrated in FIGS. 10A and 10B, respectively. Grid block oil saturation is measured by the shaded graph 1004, 1008 in FIGS. 10A and 10B, respectively. In the closed-loop control case, a more uniform oil saturation distribution is seen resulting in better vertical sweep efficiency.

A summary of the production strategies employed over a period of 8 years along with the NPV values and the oil recovery values are shown in Table 4. In the no-control and reactive-control cases, water injection is not guided by any economic objective. Rather, both injection layers are open and react to the reservoir pressure decline, driven by production. As a comparative result, the closed-loop control case was able to reduce cumulative water production (CWP) by 54% and reduce cumulative water injection (CWI) by 41% compared to the uncontrolled case, resulting in a NPV increase of $19 million. However, a comparison with the reactive control case shows an increase in the cumulative oil production (COP) by 0.9 MMSTB for original oil in place (OOIP) of 6.8 MMSTB resulting in a NPV increase of almost $12 million.

TABLE 4

| Production mode | NPV ($ MM) | COP (MSTB) | CWP (MSTB) | CWI (MSTB) | Recovery (%) |
|---|---|---|---|---|---|
| No control | 47.7 | 3.6 | 10.1 | 14.7 | 52.9 |
| Reactive control | 54.6 | 2.4 | 0.4 | 5.1 | 35.3 |
| Closed-loop control | 66.3 | 3.5 | 4.6 | 8.7 | 51.4 |

Model Prediction

Figure 11A:
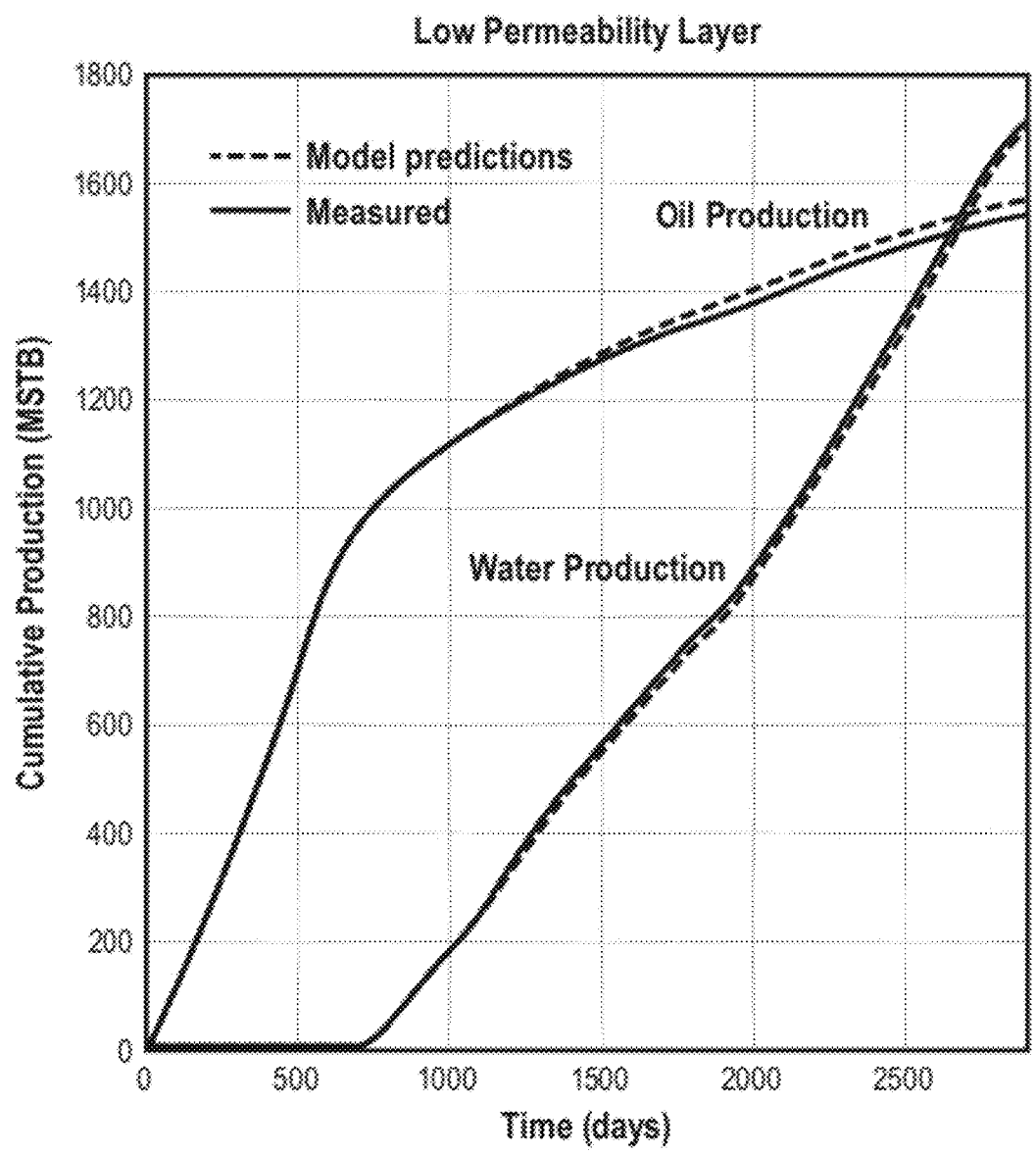
FIG. 11A illustrates cumulative oil and water production and a comparison between the model prediction and the field measurement for the low permeability layer.
Figure 11B:
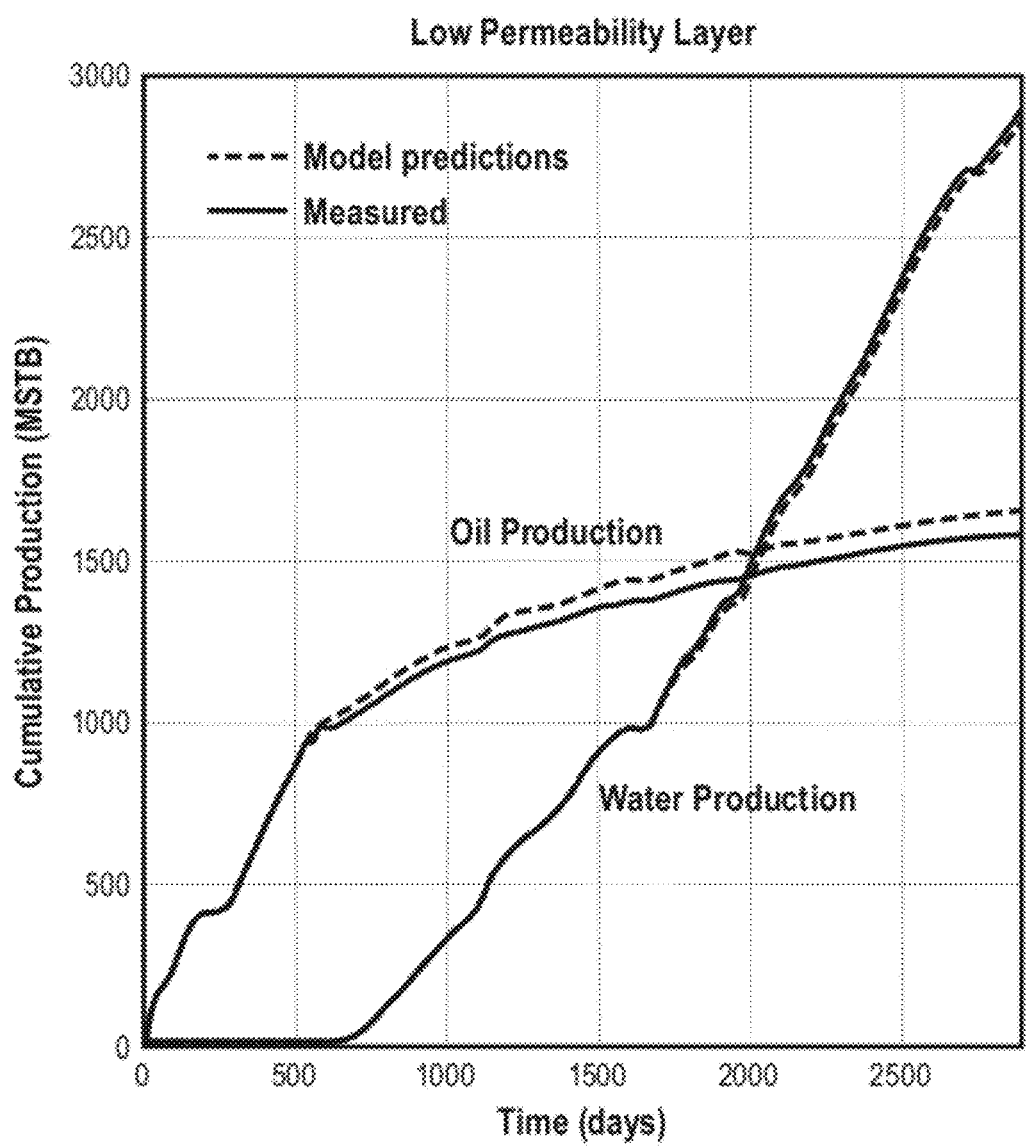
FIG. 11B illustrates cumulative oil and water production and a comparison between the model prediction and the field measurement for the high permeability layer.

As disclosed above, developing model structures as shown in equation (4) that do not violate first principles, yet have parameters that can be identified in real-time from field data, is of importance. While such a parametric model may not be perfect, it should at least capture the elements of the reservoir dynamic behavior that are important for continuous optimization using feedback. The results of the model prediction of the closed-loop control case are illustrated in FIGS. 11A and 11B for the low-permeability layer and the high-permeability layer, respectively. It can be seen that almost perfect agreement is observed between the parametric model and the field measurement for both the cumulative oil and water production. However, it should be noted that a small deviation is observed between the predicted and the measured oil production after water breaks through in the high permeability layer (FIG. 11B) around 650 days. This error can be attributed to the fact that, although the model cannot predict the onset of water before water has broken through, it progressively adapts to the new conditions keeping this mismatch within reasonable limits.

Figure 12:
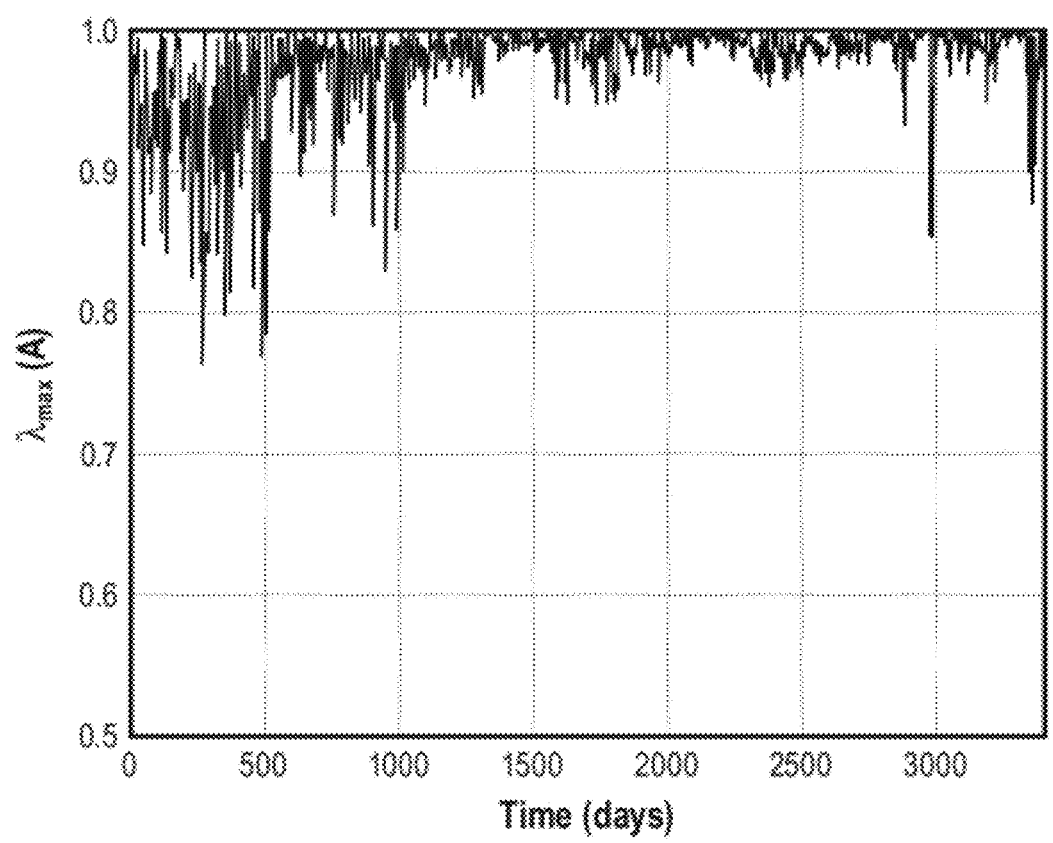
FIG. 12 illustrates the maximum eigenvalues of matrix A in equation (4).

Referring now to FIG. 12, the maximum eigenvalue of the daily updated parametric model is illustrated. The estimated, maximum eigenvalue at each time step is very close to unity, which illustrates the integrating effect of the reservoir model. This result was also confirmed by the detailed eigenvalues analysis well known in the art, which includes the following two scenarios:
1) The matrix A has at least 2 (and 3 for three-phase flow) eigenvalues exactly equal to zero irrespective of how the reservoir is discretized.
2) For the special case of zero capillary pressure or zero capillary pressure gradients with respect to the water saturation, the matrix A has at least m×n zero eigenvalues (2-D reservoir discretization (m, n)).

Thus, a new methodology to develop and continuously update short-term parametric models consistent with the full-physics reservoir model using well known methods of system identification for multivariable dynamical systems is provided. These models can effectively provide short-term predictions (days to weeks) for the purpose of optimizing production in a multi-scale framework using a moving horizon formulation. The multi-scale framework has two levels. The upper level optimizes the NPV function (weeks), subject to physical constraints, by calculating the optimum values of the production and injection flow settings. The upper level then passes these optimal values as set-points to the lower level, which uses a model-based predictive (MPC) control strategy to achieve these set-points on a daily basis.

The example demonstrated the possibility of using such a real-time closed-loop control strategy when applied to production or reservoir management projects, as compared with reacting to well performance. Further, the methodology considers the typical field production operations work processes to suit the data needs for the proposed approach. The strategy presented here can be refined in a number of ways, such as investigating the effect of various parameters, i.e., horizon lengths and weighting on the optimum values; analysis to understand water breakthrough to see if the model can be refined to predict water breakthrough.

Selection of Technology

Although RTO technologies are relatively new to oil and gas industry, the selection of appropriate technology, which is described in "Real Time Operations in Asset Performance Workflows," by Garcia, A., S. Sankaran, J. Rodriguez, L. Saputelli, G. Mijares, C. Ramalho, B. Romano, P. Sergio de Sousa, and M. Herdeiro ("SPE 111990") and which is incorporated herein by reference, is critical to the success of digital oilfield projects. As production operations become increasingly complex, real time monitoring, optimization and control methodologies are required to maintain high productivity and operational excellence. Smarter strategies for flexible and adoptive operations are required. The most successful operations are those that are closely monitored and adjusted according to changing production conditions. Although these principles are intuitive, achieving them is very difficult in practice due to uncertainties and complex nature of operations. This requires continuous and dynamic optimization of operations based on changing production conditions.

Being multi-disciplinary in nature, RTO requires infusion of technologies related to workflow automation, optimization, visualization, system integration and data management, among other things, beyond the traditional realm of conventional simulation tools. It is required that there is information availability and visibility across the enterprise. Closer integration and better information flows are required, where asset personnel can collaborate effectively. Further, it is necessary to ensure the existing skill set of the asset personnel are adequately augmented by the chosen technology, thus closing the gap between asset potential and current practice. The technology should be suitable for direct use in engineering analysis, while reducing the investment on redevelopment. Scalability and flexibility are two vital aspects of RTO technologies, as new work processes are added and existing work processes are modified. It should be noted the chosen technologies should not impose restrictions on their future use.

As information and valuable knowledge are shared within the organization through application of RTO technologies, it enables systematic data transformation tasks and provides a common data repository and interface for that data. It is essential that strict principles should be enforced around unnecessary data duplication to ensure common set of data used for all decision-making processes. A judicious choice of data management methods should be used as dictated by the asset needs.

A flexible, standardized architecture is required to support the connection of various applications and the sharing of data. In order to achieve this, it is imperative that open standards (e.g. OPC, Web services etc.) are used as much as possible in accordance with the best practices in the industry. This applies to both data interfaces (OPC, OLEDB, ODBC, etc.) and application interfaces (web services, PRODML etc.). A service-oriented architecture (SOA) is suitable here to integrate existing and prospective systems and work processes. Federation of resources is expected to help both rapid deployment and maintenance of the deployed systems.

Figure 13:
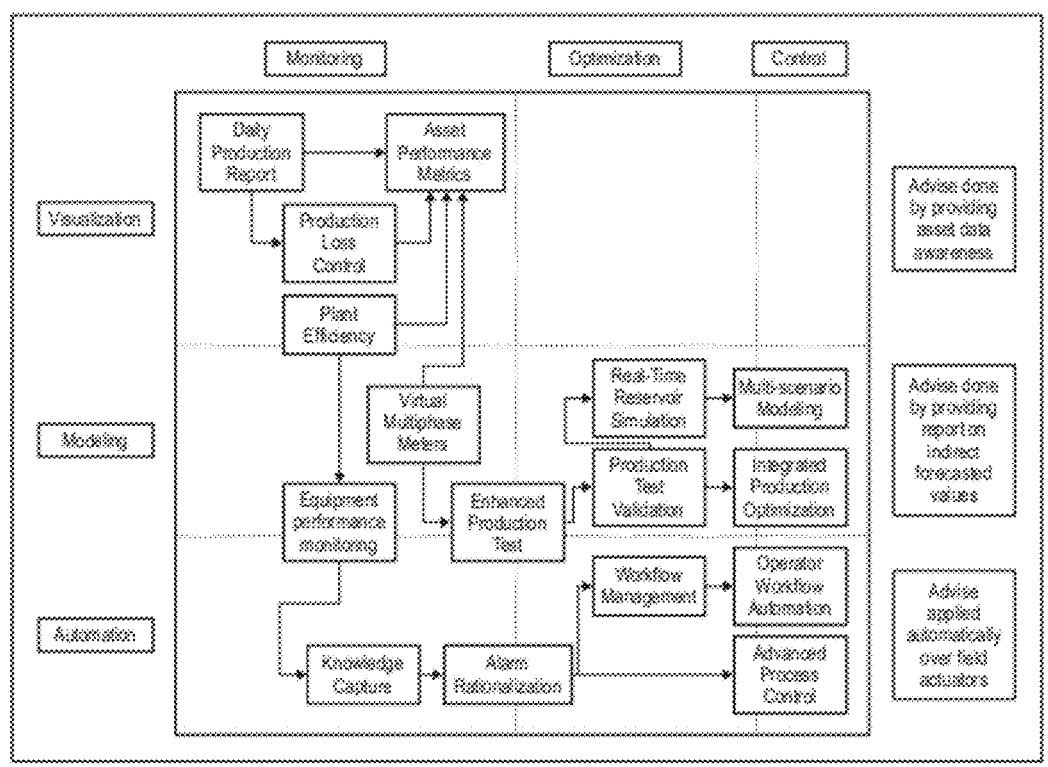
FIG. 13 is a block diagram illustrating the components of multiple asset performance workflows implemented during real time reservoir operations

Various technologies may be employed that achieve the following functions:

1. Data integration, information services and visualization, and
2. Application integration and workflow orchestration
3. User integration through a common web based environment Sixteen components may be identified in connection with asset performance workflows, as illustrated in FIG. 13. Each component covers a part of the functions described above. The scope of the present invention is based on a methodology to get value from the implementation of Visualization and Modeling components (technologies) first, before implementing the Automation related components. The first phase of implementation includes the following ten components:

Daily Production Reporting: Gives a standardized way to report daily data from the platforms and where validation is reinforced.

Asset Performance Metrics: Presents a platform processes monitoring approach of the operations parameters per sector and area, creating a commitment of the people for the success of the performance seeking the goals.

Production Loss Control: Identifies where, when the production losses occur and who is responsible for them; the idea is to generate automatic identification and analysis resulting on a more real picture of the bottlenecks and actions to correct or minimize them.

Plant Efficiency: Automatically calculates of operational time and availability of platform equipments.

Enhanced Production Test: Supports to conduct and optimize well testing procedures, by collecting, validating and consolidating data and focusing on well productivity.

Virtual Multi-phase Meters: Automatic calculation of multiphasic flows based on sensors data.

Production Test Validation: Automatically adjust well performance model parameters and validation of well potentials.

Integrated Production Optimization: Automatic calculation of optimized operational points of the asset, controlling variables from the reservoir to the sales point.

Real Time Reservoir Simulation: Long and short term simulations using most recent information from the asset.

Multiscenario Modeling: Captures and manages multiple model scenarios to provide adequate information for making decisions such as selecting optimum forecast plans from alternatives, enabling optimum sweep efficiency and reserves recovery.

All components are interconnected in a way that reflects the flow of information according to the operations and workflows of the asset. As an igniting strategy, two components from different technologies (e.g., Visualization and Modeling) may be implemented in parallel in order to adjust and pursue an effective integration. Exemplary components that may be implemented in parallel include the daily production report (Visualization) and the production test validation (Modeling).

The remaining six components are primarily Automation-related components, which are implemented during the second phase and include:

Equipment Performance Monitoring: Monitors the performance of the asset using visual representation of equipment performance envelopes and historical/current operating points. Issues alarms when deviations from optimal operating performance are encountered.

Knowledge Capture: Captures the operating knowledge and associated technical information for specific critical production equipments (e.g. gas compression, oil pumping system etc.); serves as a repository for capturing failure performance and available for consultation about the asset resources.

Workflow Management: Allows users to launch work processes; allows monitoring of its execution and interaction with the business process.

Operator Workflow Automation: Automates operations monitoring and advises using expert system technology that will support and minimize operator intervention through the execution of processes such as equipment startup/shutdown, oil transfer, production ramp up/down, etc.

Advanced Process Control: Implements an advanced process control application to stabilize plant operation and allow production improvements through maximum utilization of production facilities while observing well availability and other operating constraints.

Alarm Rationalization: Reviews alarms in the DCS and prioritizes the alarms based on the work processes of the operators. Allows better monitoring of the DCS alarms' effectiveness, modifications and management of change.

The components presented are designed taking into consideration predictions that make use of the real time data to allow operators and managers to work on a proactive basis rather than on a reactive basis.

For every component, the following project execution approach is followed:

Basic Engineering: Where all technical specifications are collected including minimal interaction with other workflows of the system.

Detailed Engineering: Where component functionalities are designed, generating a list of demands such as: database accesses, user interfaces specifications, software licenses, performance speed, communication channels, model procedures update, expected outcomes.

Implementation: Reality envisioned during the detailed design is achieved by validation of the expected outcomes.
  a. Component Testing
  b. Training & Documentation Review of component performance: Period of time taken to guarantee the optimal functioning of the component.

Results of a Production Test Validation are matching the expected outcomes from the detailed engineering phases, such as:

50-80% reduction in workflow time execution.

Most recent valid well models available for the use of asset performance events simulations (considered in other components of the system), such as: asset set point optimization, compressor failure avoidance, min/max delivery flows/pressures, etc.

Automatic data collection for well test validation.

New Standardized Calculations, eliminating subjective criterions of the different engineers involved in the data validation tasks.

Consolidation of simulation results in a database; eliminating the use of excel spreadsheets that are more difficult to analyze and to maintain.

Easy and immediate ways to establish communication of well test results, once the test has been validated. In the cases of new well potentials identified, to guarantee a fast tracking of the most recent asset performances and contribute to production losses control.

Training and change management successfully implemented.

Results of a Daily Production Reporting component, in phase of implementation:
  Minimize data entry efforts for the operator, leaving more time for other activities
  Priority efforts over the data being reported, less but more quality data for the asset
  Standardized Calculations
  Data Validation rules to minimize errors and misleading information
  Approval process workflow established Results of the Asset Performance Metrics component, in phase detailed engineering:
  Alignment of all sectors in the metrics detailing and validation rules
  Operational and Performance alarms identified
  Data Validation rules before the metric is analyzed by the user. Rules have been applied according to the purpose of the metrics and not according to the nature of the variables
  Integration of multiple sectors and real-time databases oriented to monitoring of individual metric goals and contribution to the visualization of the asset performance
  Strategy seen as a fulcrum by other assets that require similar requirements.

This implementation of asset performance workthrows during real time production operations and monitoring provides significant benefits. This invention demonstrates value for the asset performance visualization, modeling and automation and that real-time operations in asset performance workflows is feasible and supports the paradigm of people, workflows, and technology. Incident to use of the present invention is a phased execution approach including a basic engineering and a detailed engineering phase, which is crucial. Additionally, periodic project reviews should be conducted to identify potential impacts in execution after implementation of the early components. A flexible technology platform provides for management of different data sources, diverse kinds of applications, including existing ones, and for the use of diverse groups of people. Such a platform allows the integration to occur at the data, application, and user level. In order to capture the benefits and value of the system, it is necessary to engage all stakeholders early in the project making sure they understand their roles on the success of the implementation. The present invention meets this requirement by:
  Joining distant teams to work together on the same platform and same workflows, and effectively work in a multidisciplinary manner where expertise of all levels is made available.
  Providing visibility of workflow tasks being executed to all sectors and put together the results of the connected production workflows to provide the big picture of the performance of the asset.
  Connecting decisions made on integrated production workflows where impacts on other sectors are measureable, and where preventive/corrective actions can be taken at the right time, supported by integrated models that look for solutions that continuously optimize.
  Performing a detailed design of every component to be implemented in order to make sure that final results are expected, no surprises, and users can take ownership of the system.
  Defining and standardizing calculation rules and algorithms based on the reality of the data available and best models that apply for a workflow, and when available trying to incorporate international standards.
  Offering a technology platform flexible enough to link the available infrastructure, hardware and software, and fill the gaps to implement the real time operations workflows demanded by the asset. Key technologies to be offered would be driven by the asset and not vice versa.
  Providing Total Asset Awareness: establishing clear communication channels between sectors involved in use of the system and its components.
  Delivering a phased approach to guarantee the knowledge transfer and facilitate the training and change management.

Additionally, challenges exist to achieving the main objective of a continuous production optimization of the asset. Technical challenges can be presented separately but the different solutions need to be integrated. The project and its participants (the asset sectors, management, business unit and corporate IT department) need to jointly overcome the challenges in order to avoid disintegration across performance workflows without breaking the silos, and as a consequence, keep the asset in a sub-optimal setting and never closing the gap between the actual production and the asset potential. Among the challenges to be considered, both technical and non-technical ones, there are:
  Emphasize the efforts during the detailed engineering phase to the participants. The detailed engineering phase is the basis for a successful component of the solution. All participants need to understand the scope during this stage in order to be aligned during the implementation. Prototyping of separated components is not a valid option because there is a risk of not having them integrated. Demos are allowed with the purpose of showing progress of the implementation or to show detailed engineering agreed functionalities.
  Smart reengineering of components integration, after detailed engineering phases are completed, making sure the overall objectives of the system are not jeopardized.
  Alignment of IT departments on support for data, infrastructure and acquisition.
  Assure that the design of the integrated applications platform is a product of a process that considers people, workflows, and technology. The right balance of these three design components needs to be obtained to maximize the lifecycle benefits of the system.
  Assure that defined applications include those already in existence that were adding value to the asset. Exclusions need to be justified to the final users, otherwise other challenges such as change management will be more difficult than expected and costs of project will be over budgeted.
  Continuous bi-directional communication between the asset and the implementation team, in order to inform project progress and asset evolvement.
  During the design and implementation phases, take into consideration industry standards when fulfilling asset requirements. This will minimize reengineering efforts where new technologies are implemented.
  Keep all stakeholders in the asset and other departments in the company on board with their responsibility and role of the success of the project. A minor reluctance from a user could result in a bad decision at the same or different level. Also, not forgetting that participants also have day to day duties to cover.

While the present invention has been described in connection with presently preferred embodiments, it will be understood by those skilled in the art that it is not intended to limit the invention to those embodiments. The present invention, for example, may also be applied to other real time production operations, which are common in chemical plants and manufacturing facilities. It is therefore, contemplated that various alternative embodiments and modifications may be made to the disclosed embodiments without departing from the spirit and scope of the invention defined by the appended claims and equivalents thereof.

The invention claimed is:

1. A computer-implemented method for implementing asset performance workflows during real-time reservoir operations, comprising:
   collecting field data associated with one or more hydrocarbon fluid reservoirs, the field data representing a production condition existing within the one or more hydrocarbon fluid reservoirs;
   identifying, by a processing device, a plurality of technologies associated with hydrocarbon fluid production associated with the one or more hydrocarbon fluid reservoirs, each technology of the plurality of technologies including a sequence of one or more executable components, the plurality of technologies including at least visualization technology, modeling technology, and automation technology, the modeling technology including a first sequence of executable components or a second sequence of executable components, the first sequence including a plant efficiency component and an equipment performance monitoring component, and the second sequence including a virtual multi-phase meters component, an enhanced production test component, a production test validation component, a real-time reservoir simulation component, and an integrated production optimization component;
   selecting, by the processing device, a first group of technologies from the plurality of technologies, the first group of technologies including the visualization technology or the modeling technology;
   selecting, by the processing device, a second group of technologies from the plurality of technologies, the second group of technologies including at least the automation technology;
   performing a multi-phase asset performance workflow in association with the one or more hydrocarbon fluid reservoirs by executing the first group of technologies in a first asset performance workflow and the second group of technologies in a second asset performance workflow, the first asset performance workflow being performed before the second asset performance workflow, wherein implementing the first group of technologies includes performing the first sequence or the second sequence, the performance of the multi-phase asset performance workflow being caused by the processing device, and the performance of the multi-phase asset performance workflow by the processing device automatically engaging one or more field actuators within the one or more hydrocarbon fluid reservoirs;
   in response to performing the multi-phase asset performance workflow, receiving a feedback signal indicating a new performance condition existing within the one or more hydrocarbon fluid reservoirs; and
   determining one or more adjustments to the multi-phase asset performance workflow based on the new performance condition, the one or more adjustments improving the hydrocarbon fluid production from the one or more hydrocarbon fluid reservoirs.

2. The method of claim 1, wherein the visualization technology comprises a daily production report component, a production loss control component, and a plant efficiency component.

3. The method of claim 2, wherein the automation technology comprises the equipment performance monitoring component, the enhanced production test component, a knowledge capture component, an alarm rationalization component, a workflow management component, an operator workflow automation component and an advanced process control component.

4. The method of claim 3, wherein the first group comprises the virtual multi-phase meters component, the enhanced production test component, the real time reservoir simulation component, a multi-scenario modeling component, the production test validation component, and the integrated production optimization component.

5. The method of claim 3, wherein the second group comprises the plant efficiency component, the equipment performance monitoring component, the knowledge capture component, the alarm rationalization component, the workflow management component, the operator workflow automation component and the advanced process control component.

6. The method of claim 3, further comprising implementing a third group of technologies in a third asset performance workflow before implementing the second group of technologies, the third group comprising only the visualization technology and the modeling technology.

7. The method of claim 6, wherein the third group comprises the virtual multi-phase meters component and an asset performance metrics component.

8. The method of claim 3, further comprising implementing a fourth group of technologies in a fourth asset performance workflow before implementing the second group of technologies, the fourth group comprising only the visualization technology.

9. The method of claim 8, wherein the fourth group comprises the daily production report component, the production loss control component and an asset performance metrics component.

10. The method of claim 3, wherein the first group comprises the virtual multi-phase meters component and an asset performance metrics component.

11. The method of claim 3, wherein the first group comprises the daily production report component, the production loss control component and an asset performance metrics component.

12. The method of claim 3, wherein the first group comprises the plant efficiency component and an asset performance metrics component.

13. The method of claim 3, further comprising implementing a fifth group of technologies in a fifth asset performance workflow before implementing the second group of technologies, the fifth group comprising only the visualization technology and the modeling technology.

14. The method of claim 13, wherein the fifth group comprises the plant efficiency component and an asset performance metrics component.

15. A non-transitory program carrier device tangibly carrying computer executable instructions for implementing asset performance workflows during real time reservoir operations, the instructions being executable to implement:
   collecting field data associated with one or more hydrocarbon fluid reservoirs, the field data representing a production condition existing within the one or more hydrocarbon fluid reservoirs;

identifying a plurality of technologies associated with hydrocarbon fluid production associated with the one or more hydrocarbon fluid reservoirs, each technology of the plurality of technologies including a sequence of one or more components, the plurality of technologies including at least visualization technology, modeling technology and automation technology, the modeling technology including a first sequence of components or a second sequence of components, the first sequence including a plant efficiency component and an equipment performance monitoring component, and the second sequence including a virtual multi-phase meters component, an enhanced production test component, a production test validation component, a real-time reservoir simulation component and an integrated production optimization component;

selecting a first group of technologies from the plurality of technologies, the first group of technologies including the visualization technology or the modeling technology;

selecting a second group of technologies from the plurality of technologies, the second group of technologies including at least the automation technology;

performing a multi-phase asset performance workflow in association with the one or more hydrocarbon fluid reservoirs by executing the first group of technologies in a first asset performance workflow and the second group of technologies in a second asset performance workflow, the first asset performance workflow being performed before the second asset performance workflow, wherein implementing the first group of technologies includes performing the first sequence or the second sequence, the performance of the multi-phase asset performance workflow being caused by a processing device, and the performance of the multi-phase asset performance workflow by the processing device automatically engaging one or more field actuators within the one or more hydrocarbon fluid reservoirs;

in response to performing the multi-phase asset performance workflow, receiving a feedback signal indicating a new performance condition existing within the one or more hydrocarbon fluid reservoirs; and determining one or more adjustments to the multi-phase asset performance workflow based on the new performance condition, the one or more adjustments improving the hydrocarbon fluid production from the one or more hydrocarbon fluid reservoirs.

16. The program carrier device of claim 15, wherein the visualization technology comprises a daily production report component, a production loss control component, and a plant efficiency component.

17. The program carrier device of claim 16, wherein the automation technology comprises the equipment performance monitoring component, the enhanced production test component, a knowledge capture component, an alarm rationalization component, a workflow management component, an operator workflow automation component and an advanced process control component.

18. The program carrier device of claim 17, wherein the first group comprises the virtual multi-phase meters component, the enhanced production test component, the real time reservoir simulation component, a multi-scenario modeling component, the production test validation component, and the integrated production optimization component.

19. The program carrier device of claim 17, wherein the second group comprises the plant efficiency component, the equipment performance monitoring component, the knowledge capture component, the alarm rationalization component, the workflow management component, the operator workflow automation component and the advanced process control component.

20. The program carrier device of claim 17, further comprising implementing a third group of technologies in a third asset performance workflow before implementing the second group of technologies, the third group comprising only the visualization technology and the modeling technology.

21. The program carrier device of claim 20, wherein the third group comprises the virtual multi-phase meters component and an asset performance metrics component.

22. The program carrier device of claim 17, further comprising implementing a fourth group of technologies in a fourth asset performance workflow before implementing the second group of technologies, the fourth group comprising only the visualization technology.

23. The program carrier device of claim 22, wherein the fourth group comprises the daily production report component, the production loss control component and an asset performance metrics component.

24. The program carrier device of claim 17, wherein the first group comprises the virtual multi-phase meters component and an asset performance metrics component.

25. The program carrier device of claim 17, wherein the first group comprises the daily production report component, the production loss control component and an asset performance metrics component.

26. The program carrier device of claim 17, wherein the first group comprises the plant efficiency component and an asset performance metrics component.

27. The program carrier device of claim 17, further comprising implementing a fifth group of technologies in a fifth asset performance workflow before implementing the second group of technologies, the fifth group comprising only the visualization technology and the modeling technology.

28. The program carrier device of claim 27, wherein the fifth group comprises the plant efficiency component and an asset performance metrics component.

* * * * *